(12) United States Patent
Narita et al.

(10) Patent No.: US 8,076,413 B2
(45) Date of Patent: Dec. 13, 2011

(54) AQUEOUS METALLIC COATING COMPOSITION AND METHOD FOR FORMING A MULTILAYER COATING FILM

(75) Inventors: Nobuhiko Narita, Hiratsuka (JP); Shuichi Nakahara, Aichi (JP); Hiroyuki Onoyama, Aichi (JP); Hironori Tonomura, Aichi (JP); Yasushi Nakao, Aichi (JP); Yoshizumi Matsuno, Aichi (JP)

(73) Assignee: Kansai Paint Co., Ltd., Hyogo (JP)

( * ) Notice: Subject to any disclaimer, the term of this patent is extended or adjusted under 35 U.S.C. 154(b) by 391 days.

(21) Appl. No.: 12/311,559

(22) PCT Filed: Sep. 27, 2007

(86) PCT No.: PCT/JP2007/069411
§ 371 (c)(1),
(2), (4) Date: Apr. 3, 2009

(87) PCT Pub. No.: WO2008/044583
PCT Pub. Date: Apr. 17, 2008

(65) Prior Publication Data
US 2009/0280256 A1   Nov. 12, 2009

(30) Foreign Application Priority Data

Oct. 3, 2006  (JP) ................. 2006-272303

(51) Int. Cl.
*B05D 1/36* (2006.01)
*B05D 7/16* (2006.01)
*B32B 15/08* (2006.01)
*C08K 3/20* (2006.01)
*C08L 33/14* (2006.01)

(52) U.S. Cl. .......... 525/72; 427/409; 428/458; 428/461; 524/504; 524/507; 524/513; 524/521; 525/64; 525/66; 525/123; 525/124; 525/175; 525/209

(58) Field of Classification Search ................. 427/409; 428/458, 461; 524/504, 507, 513, 521; 525/64, 525/66, 72, 123, 124, 175, 209
See application file for complete search history.

(56) References Cited

U.S. PATENT DOCUMENTS

| 5,151,125 A | 9/1992 | Kuwajima et al. |
| 2003/0066457 A1 * | 4/2003 | Hashizume et al. .......... 106/404 |
| 2003/0114617 A1 | 6/2003 | Yukawa et al. |

FOREIGN PATENT DOCUMENTS

| EP | 1 302 487 | 4/2003 |
| JP | 62-30167 | 2/1987 |
| JP | 2007-126608 A * | 5/2007 |
| JP | 2007-197705 A * | 8/2007 |

* cited by examiner

*Primary Examiner* — Robert Sellers
(74) *Attorney, Agent, or Firm* — Wenderoth, Lind & Ponack, L.L.P.

(57) ABSTRACT

The present invention provides an aqueous metallic coating composition comprising: (A) an aqueous film-forming resin; (B) a curing agent; (C) a phosphoric acid group-containing resin having an acid value of 10 to 200 mg KOH/g and obtained by copolymerizing a phosphoric acid group-containing polymerizable unsaturated monomer (a) represented by formula (1) with other polymerizable unsaturated monomer(s) (b); (D) a nitrogen-containing compound represented by formula (2); and (E) a metallic pigment. The present invention further provides a method for forming a multilayer coating film using the aqueous metallic coating composition.

23 Claims, No Drawings

AQUEOUS METALLIC COATING COMPOSITION AND METHOD FOR FORMING A MULTILAYER COATING FILM

TECHNICAL FIELD

The present invention relates to an aqueous metallic coating composition, and a method for forming a multilayer coating film using the aqueous metallic coating composition.

BACKGROUND ART

Aqueous metallic coating compositions containing a metallic pigment such as an aluminum pigment have a problem in that the metallic pigment comes into contact with a large amount of water and reacts therewith to generate hydrogen gas.

To solve this problem, incorporation of a phosphoric ester into the aqueous metallic coating composition has been proposed to protect the metallic pigment surface with a phosphoric ester by the adsorbing action of acidic hydroxy groups bonded to the phosphorus atoms in the ester, thereby inhibiting the reaction caused by direct contact between water and the metallic pigment.

For example, Japanese Unexamined Patent Publication No. 1987-30167 discloses an aqueous metallic coating composition comprising: an acrylic resin having a hydroxy value of 30 to 150 mg KOH/g and obtained by copolymerizing a specific phosphate group-containing monomer with an α,β-ethylenic unsaturated monomer; a curing agent; and a metallic pigment. The publication describes that the aqueous metallic coating composition can form a coating film with excellent water resistance against discoloration and excellent metallic appearance. However, the coating film formed using the metallic coating composition is insufficient in terms of smoothness and water-resistant adhesion.

U.S. Pat. No. 5,151,125 discloses an aqueous metallic coating composition comprising: an acrylic resin having an acid value of 15 to 200 mg KOH/g and a hydroxy value of 20 to 200 mg KOH/g and prepared by copolymerizing an ethylenic monomer and a phosphoric acid group-containing monomer having an alkylene oxide chain; a curing agent; and a metallic pigment. The patent describes that the aqueous metallic coating composition can form a coating film with high adhesion and excellent water resistance against discoloration. However, the coating film formed using the aqueous metallic coating composition is insufficient in terms of smoothness, luster, and water-resistant adhesion.

DISCLOSURE OF THE INVENTION

An object of the present invention is to provide an aqueous metallic coating composition that has excellent storage stability and is capable of forming a coating film with excellent smoothness, luster, and water-resistant adhesion.

Another object of the present invention is to provide a method for forming a multilayer coating film using the aqueous metallic coating composition.

To solve the above problems, the present inventors conducted extensive research. As a result, the inventors found that when using an aqueous metallic coating composition prepared by blending an aqueous film-forming resin, a curing agent, and a metallic pigment with a specific phosphoric acid group-containing resin and a specific nitrogen-containing compound, the reaction between the metallic pigment and water is inhibited over a long period of time, so that the composition has excellent storage stability and can form a coating film with excellent smoothness, luster, and water-resistant adhesion. The present invention has been accomplished based on this finding.

The present invention provides the following aqueous metallic coating compositions and methods for forming multilayer coating films.

1. An aqueous metallic coating composition comprising:
   (A) an aqueous film-forming resin;
   (B) a curing agent;
   (C) a phosphoric acid group-containing resin having an acid value of 10 to 200 mg KOH/g and obtained by copolymerizing a phosphoric acid group-containing polymerizable unsaturated monomer (a) with other polymerizable unsaturated monomer(s) (b);
   the monomer (a) being represented by the formula

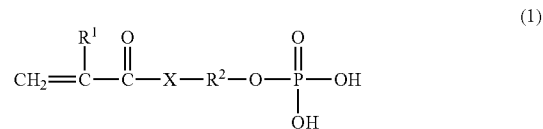

wherein $R^1$ represents a hydrogen atom or a methyl group, X represents —O— or —NH—, and $R^2$ represents a $C_{1-30}$ divalent organic group;
   (D) a nitrogen-containing compound represented by the formula

wherein $R^3$ represents a $C_{4-22}$ monovalent organic group, $R^4$ represents a $C_{4-22}$ hydrocarbon group, a $C_{4-22}$ acyl group or

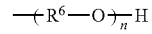

wherein $R^6$ represents a $C_{2-10}$ alkylene group, and n is an integer of 0 to 100, and when n is 2 or more, the $R^6$'s may be the same or different;
and also wherein $R^5$ represents a $C_{2-10}$ alkylene group, m is an integer of 1 to 100, and when m is 2 or more, the $R^5$'s may be the same or different; and
   (E) a metallic pigment.

2. An aqueous metallic coating composition according to item 1 wherein the aqueous film-forming resin (A) is at least one member selected from the group consisting of a hydroxy-containing acrylic resin (A1) and a hydroxy-containing polyester resin (A2).

3. An aqueous metallic coating composition according to item 2 wherein the hydroxy-containing acrylic resin (A1) is a core-shell-type water-dispersible acrylic resin (A1') comprising:
   a core copolymer (I) consisting of 0.1 to 30 mass % of a polymerizable unsaturated monomer having two or more polymerizable unsaturated groups per molecule and 70 to 99.9 mass % of a polymerizable unsaturated monomer having one polymerizable unsaturated group per molecule as monomer components; and a shell copolymer (II) consisting of 5 to 50 mass % of a hydrophobic polymerizable unsaturated monomer, 1 to 40 mass % of a hydroxy-containing polymerizable unsaturated monomer, and 10 to 94 mass % of other polymerizable unsaturated monomer(s) as monomer components; and the solids mass ratio of copolymer (I) to copolymer (II) is in the range of 10/90 to 90/10.

4. An aqueous metallic coating composition according to item 1 wherein the curing agent (B) is at least one member selected from the group consisting of amino resins, blocked polyisocyanate compounds, and carbodiimide group-containing compounds.

5. An aqueous metallic coating composition according to item 1 wherein the proportion of the aqueous film-forming resin (A) to the curing agent (B) is 50 to 90 mass % of the former to 50 to 10 mass % of the latter, based on the total mass of both components.

6. An aqueous metallic coating composition according to item 1 wherein the phosphoric acid group-containing polymerizable unsaturated monomer (a) is a monomer (a1) represented by the formula

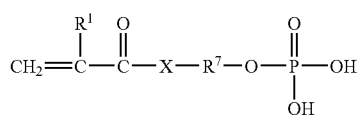

(3)

wherein $R^1$ is as defined above, and $R^7$ is a $C_{1-6}$ alkylene group.

7. An aqueous metallic coating composition according to item 1 wherein the phosphoric acid group-containing polymerizable unsaturated monomer (a) is a monomer (a2) represented by the formula

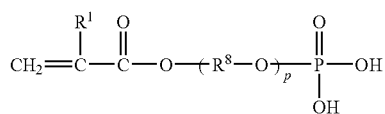

(4)

wherein $R^1$ is as defined above, $R^8$ represents a $C_{1-10}$ alkylene group, p is an integer of 3 to 30, and the $R^8$'s may be the same or different.

8. An aqueous metallic coating composition according to item 1 wherein the phosphoric acid group-containing polymerizable unsaturated monomer (a) is a monomer (a3) represented by the formula

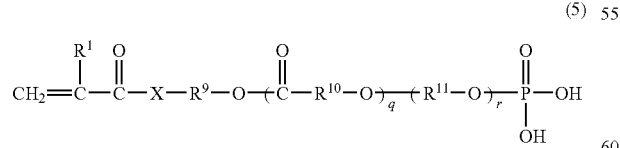

(5)

wherein $R^1$ and X are as defined above, $R^9$ represents a $C_{1-6}$ alkylene group, $R^{10}$ and $R^{11}$ independently represent a $C_{1-10}$ alkylene group, q is an integer of 1 to 30, when q is 2 or more, the $R^{10}$'s may be the same or different, r is an integer of 0 to 30, and when r is 2 or more, the $R^{11}$'s may be the same or different.

9. An aqueous metallic coating composition according to item 1 wherein the phosphoric acid group-containing polymerizable unsaturated monomer (a) is a monomer (a4) represented by the formula

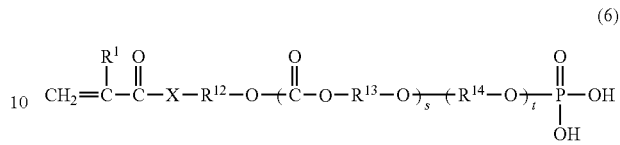

(6)

wherein $R^1$ and X are as defined above, $R^{12}$ represents a $C_{1-6}$ alkylene group, $R^{13}$ and $R^{14}$ independently represent a $C_{1-10}$ alkylene group, s is an integer of 1 to 30, when s is 2 or more, the $R^{13}$'s may be the same or different, t is an integer of 0 to 30, and when t is 2 or more, the $R^{14}$'s may be the same or different.

10. An aqueous metallic coating composition according to item 1 wherein the proportion of the phosphoric acid group-containing polymerizable unsaturated monomer (a) to the polymerizable unsaturated monomer (b) is 10 to 70 mass % of the former to 90 to 30 mass % of the latter, based on the total mass of both monomers.

11. An aqueous metallic coating composition according to item 1 wherein the polymerizable unsaturated monomer (b) comprises a hydrophobic polymerizable unsaturated monomer.

12. An aqueous metallic coating composition according to item 11 wherein the content of the hydrophobic polymerizable unsaturated monomer is 5 to 80 mass %, based on the total mass of the phosphoric acid group-containing polymerizable unsaturated monomer (a) and the polymerizable unsaturated monomer (b).

13. An aqueous metallic coating composition according to item 11 wherein the hydrophobic polymerizable unsaturated monomer is at least one monomer selected from the group consisting of $C_{6-22}$ alkyl or cycloalkyl (meth)acrylates, isobornyl-containing polymerizable unsaturated monomers, adamantyl-containing polymerizable unsaturated monomers, and aromatic ring-containing polymerizable unsaturated monomers.

14. An aqueous metallic coating composition according to item 1 wherein the proportion of the phosphoric acid group-containing resin (C) is 0.1 to 40 parts by mass, based on 100 parts by mass of the total of the aqueous film-forming resin (A) and the curing agent (B).

15. An aqueous metallic coating composition according to item 1 wherein the nitrogen-containing compound (D) is a nitrogen-containing compound (D1) represented by the formula

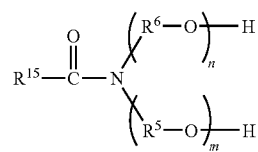

(7)

wherein $R^{15}$ represents $C_{3-21}$ hydrocarbon group, and $R^5$, $R^6$, m and n are as defined above, with the proviso that $1 \leq m+n \leq 100$.

16. An aqueous metallic coating composition according to item 1 wherein the nitrogen-containing compound (D) is a nitrogen-containing compound (D2) represented by the formula

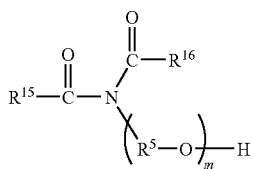

(8)

wherein $R^{15}$ and $R^{16}$ independently represent a $C_{3-21}$ hydrocarbon group, and $R^5$ and m are as defined above.

17. An aqueous metallic coating composition according to item 1 wherein the nitrogen-containing compound (D) is a nitrogen-containing compound (D3) represented by the formula

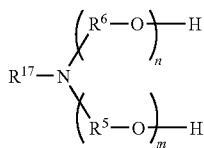

(9)

wherein $R^{17}$ represents a $C_{4-22}$ hydrocarbon group, and $R^5$, $R^6$, m and n are as defined above.

18. An aqueous metallic coating composition according to item 1 wherein the nitrogen-containing compound (D) is a nitrogen-containing compound (D4) represented by the formula

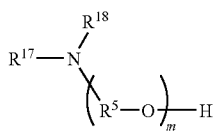

(10)

wherein $R^{17}$ and $R^{18}$ independently represent a $C_{4-22}$ hydrocarbon group, and $R^5$ and m are as defined above.

19. An aqueous metallic coating composition according to item 1 wherein the nitrogen-containing compound (D) has an HLB value of 8 to 18.

20. An aqueous metallic coating composition according to item 1 wherein the proportion of the nitrogen-containing compound (D) is 1 to 30 parts by mass, based on 100 parts by mass of the total of the aqueous film-forming resin (A) and the curing agent (B).

21. An aqueous metallic coating composition according to item 1 wherein the metallic pigment (E) is an aluminum pigment.

22. An aqueous metallic coating composition according to item 1 wherein the proportion of the metallic pigment (E) is 1 to 60 parts by mass, based on 100 parts by mass of the total of the aqueous film-forming resin (A) and the curing agent (B).

23. A method for forming a multilayer coating film comprising
(1) a step of applying the aqueous metallic coating composition of item 1 to a substrate to form a metallic base coating,
(2) a step of applying a clear coating composition to the uncured metallic base coating surface to form a clear coating, and
(3) a step of heating the uncured metallic base coating and the uncured clear coating to cure the coatings at the same time.

24. An article coated using the method of item 23.

The aqueous metallic coating composition and method for forming a multilayer coating film according to the present invention are described below in detail.

Aqueous Metallic Coating Composition

The aqueous metallic coating composition of the invention comprises as essential components: an aqueous film-forming resin (A); a curing agent (B); a specific phosphoric acid group-containing resin (C); a specific nitrogen group-containing resin (D); and a metallic pigment (E).

Aqueous Film-Forming Resin (A)

Water-soluble or water-dispersible coating film-forming resins commonly used in aqueous coating compositions can be used as the aqueous film-forming resin (A). Kinds of usable resins include, for example, acrylic resins, polyester resins, alkyd resins, polyurethane resins, etc. The aqueous film-forming resin (A) preferably has a crosslinkable functional group, such as hydroxy, carboxy, epoxy, etc.

At least one resin selected from the group consisting of hydroxy-containing acrylic resins (A1) and hydroxy-containing polyester resins (A2) is preferably used as the aqueous film-forming resin (A). Combined use of a hydroxy-containing acrylic resin (A1) and a hydroxy-containing polyester resin (A2) is more preferable for enhancing the smoothness and luster of the coating film. The proportion of the hydroxy-containing acrylic resin (A1) to the hydroxy-containing polyester resin (A2), when used together, is preferably about 20 to about 80 mass % of the former to about 80 to about 20 mass % of the latter, particularly preferably about 30 to about 70 mass % of the former to about 70 to about 30 mass % of the latter, based on the total mass of the resins.

When the aqueous film-forming resin (A) has an acid group such as carboxy, the resin (A) preferably has an acid value of about 5 to about 150 mg KOH/g, more preferably about 10 to about 100 mg KOH/g, and even more preferably about 15 to about 80 mg KOH/g. When the resin (A) has a hydroxy group, the resin (A) preferably has a hydroxy value of about 1 to about 200 mg KOH/g, more preferably about 2 to about 180 mg KOH/g, and even more preferably about 5 to about 170 mg KOH/g.

Hydroxy-Containing Acrylic Resin (A1)

To enhance the smoothness and luster of the coating film of the coating composition of the invention, the hydroxy-containing acrylic resin (A1) is preferably a core-shell-type water-dispersible acrylic resin used alone or in combination with a water-soluble acrylic resin.

The core-shell-type water-dispersible acrylic resin is preferably a resin (A1') comprising: a core that is a copolymer (I) consisting of about 0.1 to about 30 mass % of a polymerizable unsaturated monomer having two or more polymerizable unsaturated groups per molecule and about 70 to about 99.9 mass % of a polymerizable unsaturated monomer having one polymerizable unsaturated group per molecule as monomer components; and a shell that is a copolymer (II) consisting of about 5 to about 50 mass % of a hydrophobic polymerizable unsaturated monomer, about 1 to about 40 mass % of a hydroxy-containing polymerizable unsaturated monomer, and about 10 to about 94 mass % of other polymerizable unsaturated monomer(s) as monomer components; and the solids mass ratio of copolymer (I) to copolymer (II) in the resin (A1') is in the range of 10/90 to 90/10.

In this specification, the term "polymerizable unsaturated group" refers to "an unsaturated group that can be radically polymerized". Examples of such polymerizable unsaturated groups include vinyl, (meth)acryloyl, etc.

In this specification, the term "(meth)acrylate" refers to "acrylate or methacrylate". The term "(meth)acrylic acid" refers to "acrylic acid or methacrylic acid". The term "(meth)

acryloyl" refers to "acryloyl or methacryloyl". The term "(meth)acrylamide" refers to "acrylamide or methacrylamide".

In this specification, the terms "number average molecular weight" and "weight average molecular weight" refer to values as determined by GPC (gel permeation chromatography) and expressed in terms of the molecular weight of standard polystyrene.

Examples of polymerizable unsaturated monomers having two or more polymerizable unsaturated groups per molecule, that can be used as a monomer for the core copolymer (I), include allyl(meth)acrylate, ethylene glycol di(meth)acrylate, triethylene glycol di(meth)acrylate, tetraethylene glycol di(meth)acrylate, 1,3-butylene glycol di(meth)acrylate, trimethylol propane tri(meth)acrylate, 1,4-butanediol di(meth) acrylate, neopentyl glycol di(meth)acrylate, 1,6-hexanediol di(meth)acrylate, pentaerythritol di(meth)acrylate, pentaerythritol tetra(meth)acrylate, glycerol di(meth)acrylate, 1,1,1-tris-hydroxymethylethane di(meth)acrylate, 1,1,1-tris-hydroxymethylethane tri(meth)acrylate, 1,1,1-tris-hydroxymethylpropane tri(meth)acrylate, triallyl isocyanurate, diallyl terephthalate, divinylbenzene, etc. Such monomers can be used singly or in a combination of two or more.

The polymerizable unsaturated monomer having two or more polymerizable unsaturated groups per molecule functions to provide a crosslinked structure to the core copolymer (I). Although the amount of the polymerizable unsaturated monomer having two or more polymerizable unsaturated groups per molecule can be suitably selected according to the desired degree of crosslinking of the core copolymer (I), it is preferably about 0.1 to about 30 mass %, more preferably about 0.5 to about 10 mass %, and even more preferably about 1 to about 7 mass %, based on the total mass of the polymerizable unsaturated monomer having two or more polymerizable unsaturated groups per molecule and the unsaturated monomer having one polymerizable unsaturated group per molecule.

To provide the obtained coating film with excellent luster, the polymerizable unsaturated monomer having two or more polymerizable unsaturated groups per molecule is preferably an amide group-containing monomer, such as methylene bis(meth)acrylamide, ethylene bis(meth)acrylamide, etc. The amount of amide group-containing monomer, when used, is preferably about 0.1 to about 25 mass %, more preferably about 0.5 to about 8 mass %, and even more preferably about 1 to about 4 mass %, based on the total mass of the polymerizable unsaturated monomer having two or more polymerizable unsaturated groups per molecule and the unsaturated monomer having one polymerizable unsaturated group per molecule.

The polymerizable unsaturated monomer having one polymerizable unsaturated group per molecule, which is used as a monomer for the core copolymer (I), is a polymerizable unsaturated monomer that can be copolymerized with a polymerizable unsaturated monomer having two or more polymerizable unsaturated groups per molecule.

Specific examples of polymerizable unsaturated monomers having one polymerizable unsaturated group per molecule include alkyl or cycloalkyl (meth)acrylates, such as methyl (meth)acrylate, ethyl (meth)acrylate, n-propyl (meth) acrylate, i-propyl (meth)acrylate, n-butyl (meth)acrylate, i-butyl (meth)acrylate, tert-butyl (meth)acrylate, n-hexyl (meth)acrylate, n-octyl (meth)acrylate, 2-ethylhexyl (meth) acrylate, nonyl (meth)acrylate, tridecyl (meth)acrylate, lauryl (meth)acrylate, stearyl (meth)acrylate, isostearyl (meth)acrylate, cyclohexyl (meth)acrylate, methylcyclohexyl (meth) acrylate, t-butylcyclohexyl (meth)acrylate, cyclododecyl (meth)acrylate, tricyclodecanyl (meth)acrylate, etc.; polymerizable unsaturated monomers having an isobornyl group, such as isobornyl (meth)acrylate, etc.; polymerizable unsaturated monomers having an adamantyl group, such as adamantyl (meth)acrylate, etc.; polymerizable unsaturated monomers having a tricyclodecenyl group, such as tricyclodecenyl (meth)acrylate, etc.; aromatic ring-containing polymerizable unsaturated monomers, such as benzyl (meth)acrylate, styrene, α-methyl styrene, vinyltoluene, etc.; polymerizable unsaturated monomers having an alkoxysilyl group, such as vinyltrimethoxysilane, vinyltriethoxysilane, vinyltris(2-methoxyethoxy) silane, γ-(meth) acryloyloxypropyltrimethoxysilane, and γ-(meth) acryloyloxypropyltriethoxysilane, etc.; perfluoroalkyl (meth)acrylates, such as perfluorobutylethyl (meth)acrylate, perfluorooctylethyl (meth)acrylate, etc.; polymerizable unsaturated monomers having a fluorinated alkyl group, such as fluoroolefin, etc.; polymerizable unsaturated monomers having a photopolymerizable functional group, such as a maleimide group, etc.; vinyl compounds, such as N-vinylpyrrolidone, ethylene, butadiene, chloroprene, vinyl propionate, vinyl acetate, etc.; hydroxy-containing polymerizable unsaturated monomers, such as monoesterified products of (meth)acrylic acid with a dihydric alcohol containing 2 to 8 carbon atoms (e.g., 2-hydroxyethyl (meth)acrylate, 2-hydroxypropyl (meth)acrylate, 3-hydroxypropyl (meth)acrylate, 4-hydroxybutyl (meth) acrylate, etc.), ε-caprolactone-modified products of the monoesterified products of (meth)acrylic acid with a dihydric alcohol having 2 to 8 carbon atoms, N-hydroxymethyl (meth) acrylamide, allyl alcohol, (meth)acrylate having a polyoxyethylene chain with a terminal hydroxy group, etc.; carboxy-containing polymerizable unsaturated monomers, such as (meth)acrylic acid, maleic acid, crotonic acid, and β-carboxyethylacrylate, etc.; nitrogen-containing polymerizable unsaturated monomers, such as (meth)acrylonitrile, (meth)acrylamide, N,N-dimethylaminoethyl (meth)acrylate, N,N-diethylaminoethyl (meth)acrylate, N,N-dimethylaminopropyl (meth)acrylate, addition products of an amine with glycidyl (meth)acrylate, etc.; epoxy-containing polymerizable unsaturated monomers such as glycidyl (meth)acrylate, β-methylglycidyl (meth)acrylate, 3,4-epoxycyclohexylmethyl (meth)acrylate, 3,4-epoxycyclohexylethyl (meth)acrylate, 3,4-epoxycyclohexylpropyl (meth)acrylate, alkylglycidyl ether; (meth)acrylate having a polyoxyethylene chain with an alkoxy group at the molecular end; etc. Such monomers can be used singly or in a combination of two or more according to the properties required of the core-shell-type water-dispersible hydroxy-containing acrylic resin.

The hydroxy-containing polymerizable unsaturated monomer used as a monomer for the shell copolymer (II) introduces a hydroxy group that can crosslink with a curing agent (B) into a water-dispersible acrylic resin and thereby functions to enhance the water resistance of the coating film and enhance the stability of the water-dispersible acrylic resin in an aqueous medium. Examples of hydroxy-containing polymerizable unsaturated monomers include monoesterified products of (meth)acrylic acid with a dihydric alcohol containing 2 to 8 carbon atoms, such as 2-hydroxyethyl (meth) acrylate, 2-hydroxypropyl (meth)acrylate, 3-hydroxypropyl (meth)acrylate, 4-hydroxybutyl (meth)acrylate, etc.; δ-caprolactone-modified products of the monoesterified products of (meth)acrylic acid with a dihydric alcohol containing 2 to 8 carbon atoms; N-hydroxymethyl (meth)acrylamide, allyl alcohol, (meth)acrylate having a polyoxyethylene chain with a terminal hydroxy group; etc. Such monomers can be used singly or in a combination of two or more. Examples of monomers preferably used as the hydroxy-containing polymerizable unsaturated monomer include 2-hydroxyethyl (meth)acrylate, 2-hydroxypropyl (meth)acrylate, 3-hydroxypropyl (meth)acrylate, 4-hydroxybutyl (meth)acrylate, etc.

To provide the core-shell-type water-dispersible acrylic resin with excellent stability in an aqueous medium and provide the obtained coating film with excellent water resistance, the amount of hydroxy-containing polymerizable unsaturated monomer used is preferably about 1 to about 40 mass %, more preferably about 6 to about 25 mass %, and even more preferably about 7 to about 19 mass %, based on the total mass of the monomers constituting the shell copolymer (II).

The hydrophobic polymerizable unsaturated monomer used as a monomer for the shell copolymer (II) is a polymerizable unsaturated monomer containing a linear, branched or cyclic saturated or unsaturated hydrocarbon group containing 6 or more carbon atoms, excluding monomers containing a hydrophilic group, such as hydroxy-containing polymerizable unsaturated monomers. Examples of hydrophobic polymerizable unsaturated monomers include alkyl or cycloalkyl (meth)acrylates, such as n-hexyl (meth)acrylate, octyl (meth)acrylate, 2-ethylhexyl (meth)acrylate, nonyl (meth)acrylate, tridecyl (meth)acrylate, lauryl (meth)acrylate, stearyl (meth)acrylate, isostearyl (meth)acrylate, cyclohexyl (meth)acrylate, methylcyclohexyl (meth)acrylate, t-butylcyclohexyl (meth)acrylate, cyclododecyl (meth)acrylate, tricyclodecanyl (meth)acrylate, etc.; isobornyl-containing polymerizable unsaturated compounds, such as isobornyl (meth)acrylate, etc.; adamantyl-containing polymerizable unsaturated compounds, such as adamantyl (meth)acrylate, etc.; and aromatic ring-containing polymerizable unsaturated monomers such as benzyl (meth)acrylate, styrene, α-methylstyrene, vinyltoluene, etc. Such monomers can be used singly or in a combination of two or more.

To enhance the smoothness and image sharpness of the coating film, the hydrophobic polymerizable unsaturated monomer is preferably a polymerizable unsaturated monomer having an alkyl group containing 6 to 18 carbon atoms and/or a polymerizable unsaturated monomer having an aromatic ring. Styrene is particularly preferable.

To provide the core-shell-type water-dispersible acrylic resin with excellent stability in an aqueous medium and provide the obtained coating film with excellent water resistance, the amount of hydrophobic polymerizable unsaturated monomer used is preferably about 5 to about 50 mass %, more preferably about 7 to about 40 mass %, and even more preferably about 9 to about 30 mass %, based on the total mass of the monomers constituting the shell copolymer (II).

The other polymerizable unsaturated monomer(s) used as a monomer for the shell copolymer (II) are polymerizable unsaturated monomers other than hydroxy-containing polymerizable unsaturated monomers and hydrophobic polymerizable unsaturated monomers. Examples of such monomers include alkyl or cycloalkyl (meth)acrylates, such as methyl (meth)acrylate, ethyl (meth)acrylate, n-propyl (meth)acrylate, i-propyl (meth)acrylate, n-butyl (meth)acrylate, i-butyl (meth)acrylate, tert-butyl (meth)acrylate, etc.; carboxy-containing polymerizable unsaturated monomers, etc. Such monomers can be used singly or in a combination of two or more.

Specific examples of carboxy-containing polymerizable unsaturated monomers are the same as mentioned above as examples of a monomer for the core copolymer (I). Acrylic acid and/or methacrylic acid is particularly preferable as a carboxy-containing polymerizable unsaturated monomer. By using a carboxy-containing polymerizable unsaturated monomer as other polymerizable unsaturated monomer(s), the obtained core-shell-type water-dispersible acrylic resin is provided with stability in an aqueous medium.

To provide the core-shell-type water-dispersible acrylic resin with excellent stability in an aqueous medium and provide the obtained coating film with excellent water resistance, the amount of carboxy-containing polymerizable unsaturated monomer used is preferably about 1 to about 30 mass %, more preferably about 6 to about 25 mass %, and even more preferably about 7 to about 19 mass %, based on the total mass of the monomers constituting the shell copolymer (II).

To enhance the luster of the obtained coating film, monomers other than polymerizable unsaturated monomers having two or more polymerizable unsaturated groups per molecule are preferably used as other polymerizable unsaturated monomer(s) for the shell copolymer (II), thus forming an uncrosslinked copolymer (II).

To enhance the luster of the coating film, the mass ratio of the copolymer (I) to the copolymer (II) in the core-shell-type water-dispersible acrylic resin (A1') is preferably in the range of about 10/90 to about 90/10, more preferably about 50/50 to about 85/15, and even more preferably about 65/35 to about 80/20, on a solids basis.

To provide the coating film with excellent water resistance, etc., the core-shell-type water-dispersible acrylic resin (A1') preferably has a hydroxy value of about 1 to about 70 mg KOH/g, more preferably about 2 to about 50 mg KOH/g, and even more preferably about 5 to about 30 mg KOH/g.

To provide the coating composition with excellent storage stability and provide the coating film with excellent water resistance, etc., the core-shell-type water-dispersible acrylic resin (A1') preferably has an acid value of about 5 to about 90 mg KOH/g, more preferably about 8 to about 50 mg KOH/g, and even more preferably about 10 to about 35 mg KOH/g.

The core-shell-type water-dispersible acrylic resin (A1') can be prepared by a process comprising: subjecting to emulsion polymerization a monomer mixture of about 0.1 to about 30 mass % of a polymerizable unsaturated monomer having two or more polymerizable unsaturated groups per molecule, and about 70 to about 99.9 mass % of a polymerizable unsaturated monomer having one polymerizable unsaturated group per molecule to form an emulsion of a core copolymer (I); adding to this emulsion a monomer mixture of about 1 to about 40 mass % of a hydroxy-containing polymerizable unsaturated monomer, about 5 to about 50 mass % of a hydrophobic polymerizable unsaturated monomer, and about 10 to about 94 mass % of other polymerizable unsaturated monomer(s), and further performing emulsion polymerization to form a shell copolymer (II).

The emulsion polymerization for preparing an emulsion of the core copolymer (I) can be carried out according to known methods. For example, the emulsion can be prepared by subjecting the monomer mixture to emulsion polymerization in the presence of an emulsifier using a polymerization initiator.

Examples of emulsifiers preferably used are anionic emulsifiers and nonionic emulsifiers. Examples of anionic emulsifiers include sodium salts and ammonium salts of alkylsulfonic acids, alkylbenzenesulfonic acids, alkylphosphoric acids, etc. Examples of nonionic emulsifiers include polyoxyethylene oleyl ether, polyoxyethylene stearyl ether, polyoxyethylene lauryl ether, polyoxyethylene tridecyl ether, polyoxyethylene phenyl ether, polyoxyethylene nonylphenyl ether, polyoxyethylene octylphenyl ether, polyoxyethylene monolaurate, polyoxyethylene monostearate, polyoxyethylene monooleate, sorbitan monolaurate, sorbitan monostearate, sorbitan trioleate, polyoxyethylene sorbitan monolaurate, etc.

Examples of usable emulsifiers include polyoxyalkylene-containing anionic emulsifiers having an anionic group and a polyoxyalkylene group, such as a polyoxyethylene group or a polyoxypropylene group, per molecule; and reactant anionic emulsifiers having an anionic group and a radically polymerizable unsaturated group per molecule. Among these, reactant anionic emulsifiers are preferable.

Examples of reactant anionic emulsifiers include sodium salts of sulfonic acid compounds having a radically polymerizable unsaturated group, such as allyl, methallyl, (meth)acryloyl, propenyl, butenyl or the like, ammonium salts of such sulfonic acid compounds, etc. Among these, ammonium salts of sulfonic acid compounds having a radically polymerizable unsaturated group are preferable in view of the excellent water resistance of the obtained coating film. Examples of commercially available ammonium salts of such sulfonic acid compounds include "LATEMUL S-180A" (tradename of Kao Corporation).

Among the ammonium salts of sulfonic acid compounds having a radically polymerizable unsaturated group, ammonium salts of sulfonic acid compounds having a radically polymerizable unsaturated group and a polyoxyalkylene group are preferable. Examples of commercially available ammonium salts of sulfonic acid compounds having a radically polymerizable unsaturated group and a polyoxyalkylene group include "Aqualon KH-10" (tradename of ADEKA Co., Ltd.), "SR-1025A" (tradename of Asahi Denka Kogyo K.K.), etc.

The amount of emulsifier used is preferably about 0.1 to about 15 mass %, more preferably about 0.5 to about 10 mass %, and even more preferably about 1 to about 5 mass %, based on the total mass of the monomers used.

Examples of polymerization initiators include organic peroxides such as benzoyl peroxide, octanoyl peroxide, lauroyl peroxide, stearoyl peroxide, cumene hydroperoxide, tert-butyl peroxide, tert-butyl peroxylaurate, tert-butyl peroxyisopropylcarbonate, tert-butyl peroxyacetate, diisopropylbenzene hydroperoxide, etc; azo compounds such as azobisisobutyronitrile, azobis(2,4-dimethylvaleronitrile), azobis(2-methylpropiononitrile), azobis(2-methylbutyronitrile), 4,4'-azobis(4-cyanobutanoic acid), dimethyl azobis(2-methyl propionate), azobis[2-methyl-N-(2-hydroxyethyl)-propionamide], azobis[2-methyl-N-[2-(1-hydroxy butyl)]-propionamide], etc.; persulfates such as potassium persulfate, ammonium persulfate, sodium persulfate, etc.; etc. Such polymerization initiators can be used singly or in a combination of two or more. Redox initiators prepared by combining a polymerization initiator as mentioned above with a reducing agent such as sugar, sodium formaldehyde sulfoxylate, iron complex, etc. may also be used.

The amount of polymerization initiator is generally preferably about 0.1 to about 5 mass %, and more preferably about 0.2 to about 3 mass %, based on the total mass of all the monomers used. The method of adding the polymerization initiator is not particularly limited, and can be suitably selected according to the kind and amount of polymerization initiator used. For example, the polymerization initiator may be incorporated into a monomer mixture or an aqueous medium beforehand, or may be added dropwise or all at once at the time of polymerization.

The core-shell-type water-dispersible acrylic resin (A1') can be obtained by adding to the above-obtained emulsion of the core copolymer (I) a monomer mixture of a hydroxy-containing polymerizable unsaturated monomer, a hydrophobic polymerizable unsaturated monomer, and other polymerizable unsaturated monomer(s), and further performing polymerization to form a shell copolymer (II).

The monomer mixture for forming the shell copolymer (II) may optionally contain other components such as polymerization initiators as mentioned above, chain transfer agents, reducing agents, and emulsifiers, etc. The monomer mixture is preferably added dropwise as a monomer emulsion obtained by dispersing the monomer mixture into an aqueous medium, although it may be added dropwise as is. In this case, the particle size of the monomer emulsion is not particularly limited.

The method for polymerizing the monomer mixture for forming the shell copolymer (II) comprises, for example, adding the monomer mixture or emulsion thereof dropwise to the emulsion of the core copolymer (I) all at once or gradually, and heating to a suitable temperature while stirring.

The core-shell-type water-dispersible acrylic resin (A1') thus obtained has a multiple-layer structure comprising a core copolymer (I) of a monomer mixture of a polymerizable unsaturated monomer having two or more polymerizable unsaturated groups per molecule and a polymerizable unsaturated monomer having one polymerizable unsaturated group per molecule, and a shell copolymer (II) of a monomer mixture of a hydroxy-containing polymerizable unsaturated monomer, a hydrophobic polymerizable unsaturated monomer, and other polymerizable unsaturated monomer(s).

The core-shell-type water-dispersible acrylic resin (A1') thus obtained usually has a mean particle size of about 10 to about 1,000 nm, and particularly about 20 to about 500 nm.

In this specification, the mean particle size of the core-shell-type water-dispersible acrylic resin refers to a value obtained by measurement at 20° C. using a submicron particle size distribution analyzer after dilution with deionized water according to a usual method. For example, "COULTER N4" (tradename of Beckman Coulter, Inc.) can be used as the submicron particle size distribution analyzer.

To improve the mechanical stability of the particles of the core-shell-type water-dispersible acrylic resin (A1'), acid groups such as carboxy groups of the water-dispersible acrylic resin are preferably neutralized with a neutralizing agent. The neutralizing agent is not particularly limited as long as it can neutralize acid groups. Examples of such neutralizing agents include sodium hydroxide, potassium hydroxide, trimethylamine, 2-(dimethylamino)ethanol, 2-amino-2-methyl-1-propanol, triethylamine, aqueous ammonia, etc. Such a neutralizing agent is preferably used in an amount such that the pH of the aqueous dispersion of the water-dispersible acrylic resin after neutralization is about 6.5 to about 9.0.

Hydroxy-Containing Polyester Resin (A2)

In the coating composition of the present invention, use of a hydroxy-containing polyester resin (A2) as the aqueous film-forming resin (A) improves the performance of the resulting coating film in terms of smoothness and the like.

The hydroxy-containing polyester resin (A2) can usually be produced by an esterification reaction or transesterification reaction of an acid component with an alcohol component.

The acid component may be a compound that is conventionally used as an acid component for producing a polyester resin. Examples of such acid components include aliphatic polybasic acids, alicyclic polybasic acids, aromatic polybasic acids, etc.

Generally, aliphatic polybasic acids include aliphatic compounds having at least two carboxy groups per molecule; anhydrides of such aliphatic compounds; and esters of such aliphatic compounds. Examples of aliphatic polybasic acids include succinic acid, glutaric acid, adipic acid, pimelic acid, suberic acid, azelaic acid, sebacic acid, undecanedioic acid, dodecanedioic acid, brassylic acid, octadecanedioic acid, citric acid, and like aliphatic polycarboxylic acids; anhydrides of such aliphatic polycarboxylic acids; esters of such aliphatic polycarboxylic acids with about $C_1$ to about $C_4$ lower alkyls; etc. Such aliphatic polybasic acids can be used singly or in a combination of two or more.

From the viewpoint of the smoothness of the resulting coating film, it is particularly preferable to use adipic acid and/or adipic anhydride as an aliphatic polybasic acid.

Generally, alicyclic polybasic acids include compounds having at least one alicyclic structure and at least two carboxy groups per molecule; acid anhydrides of such compounds; and esters of such compounds. The alicyclic structure is mainly a 4- to 6-membered ring structure. Examples of alicyclic polybasic acids include 1,2-cyclohexanedicarboxylic acid, 1,3-cyclohexanedicarboxylic acid, 1,4-cyclohexanedicarboxylic acid, 4-cyclohexene-1,2-dicarboxylic acid, 3-methyl-1,2-cyclohexanedicarboxylic acid, 4-methyl-1,2-cyclohexanedicarboxylic acid, 1,2,4-cyclohexanetricarboxylic acid, 1,3,5-cyclohexanetricarboxylic acid, and like alicyclic polycarboxylic acids; anhydrides of such alicyclic polycarboxylic acids; esters of such alicyclic polycarboxylic acids with about $C_1$ to about $C_4$ lower alkyls; etc. Such alicyclic polybasic acids can be used singly or in a combination of two or more.

From the viewpoint of the smoothness of the resulting coating film, preferable alicyclic polybasic acids include 1,2-cyclohexanedicarboxylic acid, 1,2-cyclohexanedicarboxylic anhydride, 1,3-cyclohexanedicarboxylic acid, 1,4-cyclohexanedicarboxylic acid, 4-cyclohexene-1,2-dicarboxylic acid, and 4-cyclohexene-1,2-dicarboxylic anhydride. Among these, it is particularly preferable to use 1,2-cyclohexanedicarboxylic acid and/or 1,2-cyclohexanedicarboxylic anhydride.

Generally, aromatic polybasic acids include aromatic compounds having at least two carboxy groups per molecule; anhydrides of such aromatic compounds; and esters of such aromatic compounds. Examples of aromatic polybasic acids include phthalic acid, isophthalic acid, terephthalic acid, naphthalenedicarboxylic acid, 4,4'-biphenyldicarboxylic acid, trimellitic acid, pyromellitic acid, and like aromatic polycarboxylic acids; anhydrides of such aromatic polycarboxylic acids; esters of such aromatic polycarboxylic acids with about $C_1$ to about $C_4$ lower alkyls; etc. Such aromatic polybasic acids can be used singly or in a combination of two or more.

Preferable aromatic polybasic acids include phthalic acid, phthalic anhydride, isophthalic acid, trimellitic acid, and trimellitic anhydride.

Acid components other than aliphatic polybasic acids, alicyclic polybasic acids, and aromatic polybasic acids can also be used. Such other acid components are not limited, and include, for example, coconut oil fatty acid, cottonseed oil fatty acid, hempseed oil fatty acid, rice bran oil fatty acid, fish oil fatty acid, tall oil fatty acid, soybean oil fatty acid, linseed oil fatty acid, tung oil fatty acid, rapeseed oil fatty acid, castor oil fatty acid, dehydrated castor oil fatty acid, safflower oil fatty acid, and like fatty acids; lauric acid, myristic acid, palmitic acid, stearic acid, oleic acid, linolic acid, linolenic acid, benzoic acid, p-tert-butyl benzoic acid, cyclohexanoic acid, 10-phenyloctadecanoic acid, and like monocarboxylic acids; lactic acid, 3-hydroxybutanoic acid, 3-hydroxy-4-ethoxybenzoic acid, and like hydroxycarboxylic acids. Such acid components can be used singly or in a combination of two or more.

Polyhydric alcohols having at least two hydroxy groups per molecule can be preferably used as the above-mentioned alcohol component. Examples of such polyhydric alcohols include ethylene glycol, propylene glycol, diethylene glycol, trimethylene glycol, tetraethylene glycol, triethylene glycol, dipropylene glycol, 1,4-butanediol, 1,3-butanediol, 2,3-butanediol, 1,2-butanediol, 3-methyl-1,2-butanediol, 2-butyl-2-ethyl-1,3-propanediol, 1,2-pentanediol, 1,5-pentanediol, 1,4-pentanediol, 2,4-pentanediol, 2,3-dimethyltrimethylene glycol, tetramethylene glycol, 3-methyl-4,3-pentanediol, 3-methyl-1,5-pentanediol, 2,2,4-trimethyl-1,3-pentanediol, 1,6-hexanediol, 1,5-hexanediol, 1,4-hexanediol, 2,5-hexanediol, neopentyl glycol, 1,4-cyclohexanedimethanol, tricyclodecanedimethanol, hydrogenated bisphenol A, hydrogenated bisphenol F, and like dihydric alcohols; polylactone diols obtained by adding lactones, such as ε-caprolactone, to such dihydric alcohols; bis(hydroxyethyl) terephthalate and like ester diols; alkylene oxide adducts of bisphenol A, polyethylene glycols, polypropylene glycols, polybutylene glycols, and like polyether diols; glycerol, trimethylolethane, trimethylolpropane, diglycerol, triglycerol, 1,2,6-hexanetriol, pentaerythritol, dipentaerythritol, tris(2-hydroxyethyl) isocyanuric acid, sorbitol, mannitol, and like trihydric or higher polyhydric alcohols; polylactone polyols obtained by adding lactones, such as ε-caprolactone, to such trihydric or higher polyhydric alcohols; etc.

Alcohol components other than polyhydric alcohols can also be used. Such other alcohol components are not limited, and include, for example, methanol, ethanol, propyl alcohol, butyl alcohol, stearyl alcohol, 2-phenoxyethanol, and like monohydric alcohols; alcohol compounds obtained by reacting, with acids, propylene oxide, butylene oxide, "Cardura E10" (tradename of HEXION Specialty Chemicals; glycidyl ester of a synthetic highly branched saturated fatty acid), and like monoepoxy compounds; etc.

The production method for the hydroxy-containing polyester resin (A2) is not limited, and may be a conventional method. For example, the hydroxy-containing polyester resin can be produced by heating the acid component and alcohol component in a nitrogen stream at about 150 to about 250° C. for about 5 to about 10 hours to thereby carry out an esterification reaction or transesterification reaction of the acid component with the alcohol component.

For the esterification reaction or transesterification reaction, the acid component and alcohol component may be added to a reaction vessel at one time, or one or both of the components may be added in several portions. Alternatively, a hydroxy-containing polyester resin may be first synthesized and then reacted with an acid anhydride for half-esterification to thereby obtain a carboxy- and hydroxy-containing polyester resin. Further alternatively, a carboxy-containing polyester resin may be first synthesized, and the above-mentioned alcohol component may be added to obtain a hydroxy-containing polyester resin.

For promoting the esterification or transesterification reaction, known catalysts are usable, including, for example, dibutyltin oxide, antimony trioxide, zinc acetate, manganese acetate, cobalt acetate, calcium acetate, lead acetate, tetrabutyl titanate, tetraisopropyl titanate, etc.

The hydroxy-containing polyester resin (A2) can be modified with a fatty acid, monoepoxy compound, polyisocyanate compound, or the like, during or after the preparation of the resin.

Examples of the fatty acid include coconut oil fatty acid, cottonseed oil fatty acid, hempseed oil fatty acid, rice bran oil fatty acid, fish oil fatty acid, tall oil fatty acid, soybean oil fatty acid, flaxseed oil fatty acid, tung oil fatty acid, rapeseed oil fatty acid, castor oil fatty acid, dehydrated castor oil fatty acid, safflower oil fatty acid, etc. Preferable examples of the monoepoxy compound include "Cardura E10" (tradename of HEXION Specialty Chemicals; glycidyl ester of a synthetic highly branched saturated fatty acid).

Examples of the polyisocyanate compound include lysine diisocyanate, hexamethylene diisocyanate, trimethylhexane diisocyanate, and like aliphatic diisocyanates; hydrogenated xylylene diisocyanate, isophorone diisocyanate, methylcyclohexane-2,4-diisocyanate, methylcyclohexane-2,6-diisocyanate, 4,4'-methylene bis(cyclohexylisocyanate), 1,3-(isocyanatomethyl)cyclohexane, and like alicyclic diisocyanates; tolylene diisocyanate, xylylene diisocyanate, diphenylmethane diisocyanate, and like aromatic diisocyanates; organic polyisocyanates, such as lysine triisocyanate and like tri- or higher polyisocyanates; adducts of such organic polyisocyanates with polyhydric alcohols, low-molecular-weight polyester resins, water, and/or the like; cyclopolymers (e.g., isocyanurate), biuret adducts, etc., of such organic polyisocyanates; etc. Such polyisocyanate compounds can be used singly or in a combination of two or more.

In the hydroxy-containing polyester resin (A2), to obtain a coating film with excellent smoothness and excellent water resistance, the proportion of alicyclic polybasic acid in the acid components used as starting materials is, based on the total amount of the acid components, preferably about 30 to about 100 mol %, more preferably about 35 to about 95 mol %, and even more preferably about 40 to about 90 mol %. In particular, it is preferable to use, as an alicyclic polybasic acid, 1,2-cyclohexanedicarboxylic acid and/or 1,2-cyclohexanedicarboxylic anhydride, from the viewpoint of providing a coating film with excellent smoothness.

The hydroxy-containing polyester resin (A2) preferably has a hydroxy value of about 1 to about 200 mg KOH/g, more preferably about 2 to about 180 mg KOH/g, and even more preferably about 5 to about 170 mg KOH/g. When the hydroxy-containing polyester resin (A2) also has a carboxy group, the acid value of the resin is preferably about 5 to about 150 mg KOH/g, more preferably about 10 to about 100 mg KOH/g, and even more preferably about 15 to about 80 mg KOH/g. The hydroxy-containing polyester resin (A2) preferably has a number average molecular weight of about 500 to about 50,000, more preferably about 1,000 to about 30,000, and even more preferably about 1,200 to about 10,000.

Curing Agent (B)

The curing agent (B) is a compound that reacts with crosslinkable functional groups, such as hydroxy groups, carboxy groups, epoxy groups, etc., in the aqueous film-forming resin (A), to thereby cure the composition of the present invention. Examples of the curing agent (B) include amino resins, polyisocyanate compounds, blocked polyisocyanate compounds, epoxy-containing compounds, carboxy-containing compounds, carbodiimide group-containing compounds, etc. Among these, amino resins and blocked polyisocyanates, which react with hydroxy groups, and carbodiimide group-containing compounds, which react with carboxy groups, are preferable; with amino resins being particularly preferable. Such compounds can be used singly or in a combination of two or more as the curing agent (B).

Usable amino resins include partially or fully methylolated amino resins obtained by the reactions of amino components with aldehyde components. Examples of the amino components include melamine, urea, benzoguanamine, acetoguanamine, steroguanamine, spiroguanamine, dicyandiamide, etc. Examples of aldehyde components include formaldehyde, paraformaldehyde, acetaldehyde, benzaldehyde, etc.

Methylolated amino resins in which some or all of the methylol groups have been etherified with suitable alcohols are also usable. Alcohols that can be used for the etherification include, for example, methyl alcohol, ethyl alcohol, n-propyl alcohol, i-propyl alcohol, n-butyl alcohol, i-butyl alcohol, 2-ethylbutanol, 2-ethylhexanol, etc.

Preferable amino resins include melamine resins. Particularly preferable amino resins include methyl-etherified melamine resins obtained by etherifying some or all of the methylol groups of partially or fully methylolated melamine resins with methyl alcohol; butyl-etherified melamine resins obtained by etherifying some or all of the methylol groups of partially or fully methylolated melamine resins with butyl alcohol; and methyl-butyl-etherified melamine resins obtained by etherifying some or all of the methylol groups of partially or fully methylolated melamine resins with methyl alcohol and butyl alcohol. Among these, methyl-butyl-etherified melamine resins are particularly preferable.

These melamine resins preferably have a weight average molecular weight of about 400 to about 6,000, more preferably about 800 to about 5,000, even more preferably about 1,000 to about 4,000, and most preferably about 1,200 to about 3,000.

Commercially available melamine resins can be used, including, for example, "Cymel 202", "Cymel 203", "Cymel 238", "Cymel 251", "Cymel 303", "Cymel 323", "Cymel 324", "Cymel 325", "Cymel 327", "Cymel 350", "Cymel 385", "Cymel 1156", "Cymel 1158", "Cymel 1116", and "Cymel 1130" (tradenames of Japan Cytec Industries); "U-Van 120", "U-Van 20HS", "U-Van 20SE60", "U-Van 2021", "U-Van 2028", and "U-Van 28-60" (tradenames of Mitsui Chemicals, Inc.); etc.

In the aqueous metallic coating composition of the present invention, it is preferable to use a hydroxy-containing acrylic resin (A1'), such as a core-shell-type water-dispersible hydroxy-containing acrylic resin, as the aqueous film-forming resin (A); and to use a melamine resin with a weight average molecular weight of about 1,000 to about 4,000, and more preferably about 1,200 to about 3,000, as the curing agent (B), to obtain a coating film with excellent luster and excellent water resistance.

When a melamine resin is used as the curing agent (B), paratoluene sulfonic acid, dodecylbenzenesulfonic acid, dinonylnaphthalene sulfonic acid, or like sulfonic acid, or a salt of such a sulfonic acid with an amine compound, can be used as a catalyst.

Blocked polyisocyanate compounds are compounds obtained by blocking, with blocking agents, isocyanate groups of polyisocyanate compounds having at least two isocyanate groups per molecule. Examples of blocking agents include oximes, phenols, alcohols, lactams, mercaptans, etc.

Examples of polyisocyanate compounds having at least two isocyanate groups per molecule include hexamethylene diisocyanate, trimethylhexamethylene diisocyanate, dimer acid diisocyanate, lysine diisocyanate, and like aliphatic diisocyanates; hydrogenated xylylene diisocyanate, cyclohexylene diisocyanate, isophorone diisocyanate, and like alicyclic diisocyanates; tolylene diisocyanate, phenylene diisocyanate, 4,4'-diphenylmethane diisocyanate, xylylene diisocyanate, tetramethylxylylene diisocyanate, naphthalene diisocyanate, and like aromatic diisocyanates; 2-isocyanatoethyl-2,6-diisocyanatocaproate, 3-isocyanatomethyl-1,6-hexamethylene diisocyanate, 4-isocyanatomethyl-1,8-octamethylene diisocyanate (commonly known as triaminononane triisocyanate), and like organic tri- or higher polyisocyanate compounds; dimers and trimers of such polyisocyanate compounds; prepolymers obtained by urethanization reactions of such polyisocyanate compounds with polyhydric alcohols, low-molecular-weight polyester resins, or water, under conditions such that isocyanate groups are present in excess; etc.

Usable carbodiimide group-containing compounds include, for example, those obtained by the decarbonation reactions between isocyanate groups of the above-mentioned polyisocyanate compounds. Commercially available carbodiimide group-containing compounds are usable, including, for example, "Carbodilite V-02", "Carbodilite V-02-L2", "Carbodilite V-04", "Carbodilite E-01", and "Carbodilite E-02" (tradenames of Nisshinbo Industries, Inc.); and the like It is preferable that the proportions of the aqueous film-forming resin (A) and curing agent (B) in the aqueous metallic coating composition of the present invention be, based on the total amount of these components, about 50 to about 90 mass %, and more preferably about 60 to about 80 mass %, of the former; and about 50 to about 10 mass %, and more preferably about 40 to about 20 mass %, of the latter, to improve the smoothness and water resistance of the resulting coating film.

When the aqueous metallic coating composition of the present invention comprises a core-shell-type water-dispersible hydroxy-containing acrylic resin (A1'), the proportion of the hydroxy-containing acrylic resin (A1') is, based on the total amount of the aqueous film-forming resin (A) and curing agent (B), preferably about 2 to about 70 mass %, more preferably about 10 to about 55 mass %, and even more preferably about 20 to about 45 mass %.

When the aqueous metallic coating composition of the present invention comprises the hydroxy-containing polyester resin (A2), the proportion of the hydroxy-containing polyester resin (A2) is, based on the total amount of the aqueous film-forming resin (A) and curing agent (B), preferably about 2 to about 70 mass %, more preferably about 10 to about 55 mass %, and even more preferably about 20 to about 45 mass %.

Phosphoric Acid Group-Containing Resin (C)

The phosphoric acid group-containing resin (C) is a phosphoric acid group-containing resin with an acid value of about 10 to about 200 mg KOH/g obtained by copolymerizing a phosphoric acid group-containing polymerizable unsaturated monomer (a) represented by Formula (1)

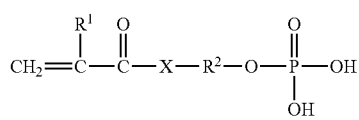

wherein $R^1$ is a hydrogen atom or a methyl group, X is —O— or —NH, and $R^2$ is a $C_{1-30}$ divalent organic group; with other polymerizable unsaturated monomer(s) (b).

In Formula (1), X is preferably —O—. The $C_{1-30}$ organic group represented by $R^2$ is preferably a $C_{1-30}$ alkylene group that may have an ether linkage, ester linkage, or carbonate linkage.

Phosphoric Acid Group-Containing Polymerizable Unsaturated Monomer (a)

The phosphoric acid group-containing polymerizable unsaturated monomer (a) is not limited as long as it is a monomer represented by Formula (1). Preferable examples of the monomer (a) include an alkylene-modified phosphoric acid group-containing polymerizable unsaturated monomer (a1), oxyalkylene-modified phosphoric acid group-containing polymerizable unsaturated monomer (a2), polyester-modified phosphoric acid group-containing polymerizable unsaturated monomer (a3), and polycarbonate-modified phosphoric acid group-containing polymerizable unsaturated monomer (a4), all described hereinafter.

The alkylene-modified phosphoric acid group-containing polymerizable unsaturated monomer (a1) is represented by Formula (3)

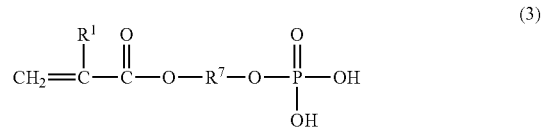

wherein $R^1$ is as defined above, and $R^7$ is a $C_{1-6}$ alkylene group. The alkylene group represented by $R^7$ may be linear or branched, and preferably has 2 to 4 carbon atoms, and more preferably 2 or 3 carbon atoms.

Examples of the alkylene-modified phosphoric acid group-containing polymerizable unsaturated monomer (a1) include acid phosphooxyethyl (meth)acrylate, acid phosphooxypropyl (meth)acrylate, acid phosphooxybutyl (meth)acrylate, acid phosphooxyhexyl (meth)acrylate, acid phosphooxydecyl (meth)acrylate, etc. These can be used singly or in a combination of two or more. Among these, acid phosphooxyethyl (meth)acrylate is particularly preferable.

The oxyalkylene-modified phosphoric acid group-containing polymerizable unsaturated monomer (a2) is a monomer represented by Formula (4)

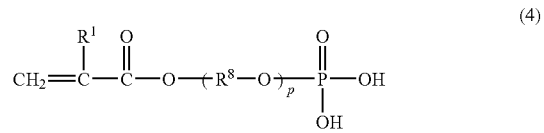

wherein $R^1$ is as defined above, $R^8$ is a $C_{1-10}$ alkylene group, p is an integer from 3 to 30, and the plurality of $R^8$'s may be the same or different. The alkylene group represented by $R^8$ may be linear or branched, and preferably has 2 to 4 carbon atoms, and more preferably 2 or 3 carbon atoms. p is preferably an integer from 4 to 20, and more preferably an integer from 5 to 15.

Examples of the oxyalkylene-modified phosphoric acid group-containing polymerizable unsaturated monomer (a2) include acid phosphooxytetra(oxyethylene) glycol mono (meth)acrylate, acid phosphooxypenta(oxyethylene) glycol mono(meth)acrylate, acid phosphooxypenta(oxypropylene) glycol mono(meth)acrylate, acid phosphooxyhexa(oxypropylene) glycol mono(meth)acrylate, etc. These can be used singly or in a combination of two or more.

The above oxyalkylene-modified phosphoric acid group-containing polymerizable unsaturated monomer (a2) can be easily synthesized by modifying (meth)acrylic acid with an alkylene oxide using a standard method, and causing a known phosphorylating agent, such as phosphorus pentaoxide, phosphorus oxychloride, or the like, to act on the modified (meth) acrylic acid; followed by hydrolysis. Alkylene oxides that can be used for the modification include ethylene oxide, propylene oxide, butylene oxide, etc. Among these, it is preferable to use ethylene oxide and/or propylene oxide, with propylene oxide being particularly preferable.

The polyester-modified phosphoric acid group-containing polymerizable unsaturated monomer (a3) is represented by Formula (5)

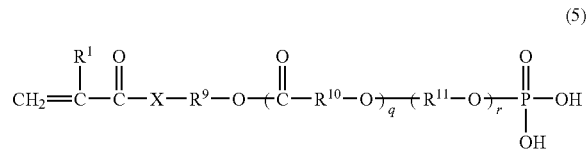

(5)

wherein $R^1$ and X are as defined above; $R^9$ is a $C_{1-6}$ alkylene group; $R^{10}$ and $R^{11}$ each independently represent a $C_{1-10}$ alkylene group; q is an integer from 1 to 30, and when q is two or more, the plurality of $R^{10}$'s may be the same or different; and r is an integer from 0 to 30, and when r is two or more, the plurality of $R^{11}$'s may be the same or different.

The alkylene group represented by $R^9$ may be linear or branched, and has 2 to 4 carbon atoms, and more preferably 2 or 3 carbon atoms.

The alkylene group represented by $R^{10}$ may be linear or branched, and preferably has 2 to 6 carbon atoms, and more preferably 4 to 6 carbon atoms.

The alkylene group represented by $R^{11}$ may be linear or branched, and preferably has 2 to 4 carbon atoms, and more preferably 2 or 3 carbon atoms.

q is preferably an integer from 1 to 20, and more preferably an integer from 1 to 10. r is preferably an integer from 0 to 20, and more preferably an integer from 0 to 10.

The polyester-modified phosphoric acid group-containing polymerizable unsaturated monomer (a3) can be easily synthesized by, for example, modifying a hydroxy-containing (meth)acrylate with a cyclic ester and/or alkylene oxide using a standard method, and causing a phosphorylating agent to act on the modified hydroxy-containing (meth)acrylate; followed by hydrolysis.

Examples of the cyclic ester include β-propiolactone, γ-butyrolactone, δ-valerolactone, ε-caprolactone, and like $C_{3-11}$ lactones. These can be used singly or in a combination of two or more. Among these, ε-caprolactone is preferable.

The phosphorylating agent may be a known phosphorylating agent, such as phosphorus pentaoxide, phosphorus oxychloride, or the like.

The polycarbonate-modified phosphoric acid group-containing polymerizable unsaturated monomer (a4) is represented by Formula (6)

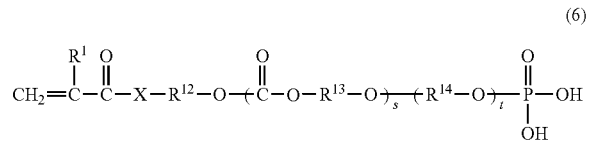

(6)

wherein $R^1$ and X are as defined above; $R^{12}$ is a $C_{1-6}$ alkylene group; $R^{13}$ and $R^{14}$ each independently represent a $C_{1-10}$ alkylene group; s is an integer from 1 to 30, and when s is two or more, the plurality of $R^{13}$'s may be the same or different; t is an integer from 0 to 30, and when t is two or more, the plurality of $R^{14}$'s may be the same or different.

The alkylene group represented by $R^{12}$ may be linear or branched, and preferably has 2 to 4 carbon atoms, and more preferably 2 or 3 carbon atoms.

The alkylene group represented by $R^{13}$ may be linear or branched. The alkylene group preferably has 2 to 6 carbon atoms, and more preferably 2 to 4 carbon atoms.

The alkylene group represented by $R^{14}$ may be linear or branched, and preferably has 2 to 4 carbon atoms, and more preferably 2 or 3 carbon atoms.

s is preferably an integer from 1 to 20, and more preferably an integer from 1 to 10. t is preferably an integer from 0 to 20, and more preferably an integer from 0 to 10.

The polycarbonate-modified phosphoric acid group-containing polymerizable unsaturated monomer (a4) can be easily synthesized by, for example, modifying a hydroxy-containing (meth)acrylate with a cyclic carbonate and/or alkylene oxide using a standard method, and causing a phosphorylating agent to act on the modified hydroxy-containing (meth)acrylate; followed by hydrolysis.

Examples of the cyclic carbonate include 1,3-dioxolane-2-one, 1,3-dioxane-2-one, 1,3-dioxepane-2-one, etc. These can be used singly or in a combination of two or more.

The phosphorylating agent may be a known phosphorylating agent, such as phosphorus pentaoxide, phosphorus oxychloride, or the like.

Other Polymerizable Unsaturated Monomer(s) (b)

The other polymerizable unsaturated monomer(s) (b) is polymerizable unsaturated monomer(s) that is different from the phosphoric acid group-containing polymerizable unsaturated monomer (a) and that is copolymerizable with the monomer (a). The monomer(s) (b) can be suitably selected and used according to the properties desired of the phosphoric acid group-containing resin (A). The following, (i) to (xix), are specific examples of the monomer(s) (b), which can be used singly or in a combination of two or more.

(i) Alkyl or cycloalkyl (meth)acrylates: e.g., methyl (meth)acrylate, ethyl (meth)acrylate, n-propyl (meth)acrylate, i-propyl (meth)acrylate, n-butyl (meth)acrylate, i-butyl (meth)acrylate, tert-butyl (meth)acrylate, n-hexyl (meth)acrylate, n-octyl (meth)acrylate, 2-ethylhexyl (meth)acrylate, nonyl (meth)acrylate, tridecyl (meth)acrylate, lauryl (meth)acrylate, stearyl (meth)acrylate, isostearyl (meth)acrylate, cyclohexyl (meth)acrylate, methylcyclohexyl (meth)acrylate, t-butylcyclohexyl (meth)acrylate, cyclododecyl (meth)acrylate, tricyclodecanyl (meth)acrylate, etc.

(ii) Isobornyl group-containing polymerizable unsaturated monomers: isobornyl (meth)acrylate and the like.

(iii) Adamantyl group-containing polymerizable unsaturated monomers: adamantyl (meth)acrylate and the like.

(iv) Tricyclodecenyl group-containing polymerizable unsaturated monomers: tricyclodecenyl (meth)acrylate and the like.

(v) Aromatic ring-containing polymerizable unsaturated monomers: benzyl (meth)acrylate, styrene, α-methylstyrene, vinyltoluene, etc.

(vi) Alkoxysilyl group-containing polymerizable unsaturated monomers: vinyltrimethoxysilane, vinyltriethoxysilane, vinyltris(2-methoxyethoxy)silane, γ-(meth)acryloyloxypropyltrimethoxysilane, γ-(meth)acryloyloxypropyltriethoxysilane, etc.

(vii) Fluorinated alkyl group-containing polymerizable unsaturated monomers: perfluorobutylethyl (meth)acrylate, perfluorooctylethyl (meth)acrylate, and like perfluoroalkyl (meth)acrylates; fluoroolefins; etc.

(viii) Polymerizable unsaturated monomers having photopolymerizable functional groups such as maleimide groups.

(ix) Vinyl compounds: N-vinylpyrrolidone, ethylene, butadiene, chloroprene, vinyl propionate, vinyl acetate, etc.

(x) Hydroxy-containing polymerizable unsaturated monomers: monoesters of (meth)acrylic acid with $C_{2-8}$ dihydric alcohols, such as 2-hydroxyethyl (meth)acrylate, 2-hydroxypropyl (meth)acrylate, 3-hydroxypropyl (meth)acrylate, 4-hydroxybutyl (meth)acrylate, etc.; ε-caprolactone-modified products of such monoesters of (meth)acrylic acid with $C_{2-8}$ dihydric alcohols; N-hydroxymethyl (meth)acrylamide; allyl alcohol; (meth)acrylates having hydroxy-terminated polyoxyethylene chains; etc.

(xi) Carboxy-containing polymerizable unsaturated monomers: (meth)acrylic acid, maleic acid, crotonic acid, β-carboxyethyl acrylate, etc.

(xii) Nitrogen-containing polymerizable unsaturated monomers: (meth)acrylonitrile, (meth)acrylamide, N,N-dimethylaminoethyl (meth)acrylate, N,N-diethylaminoethyl (meth)acrylate, N,N-dimethylaminopropyl (meth)acrylamide, methylene bis(meth)acrylamide, ethylene bis(meth)acrylamide, dimethylaminoethyl (meth)acrylate, adducts of glycidyl (meth)acrylate with amines, etc.

(xiii) Polymerizable unsaturated monomers having at least two polymerizable unsaturated groups per molecule:allyl (meth)acrylate, 1,6-hexanediol di(meth)acrylate, etc.

(xiv) Epoxy group-containing polymerizable unsaturated monomers:glycidyl (meth)acrylate, β-methylglycidyl (meth)acrylate, 3,4-epoxycyclohexylmethyl (meth)acrylate, 3,4-epoxycyclohexylethyl (meth)acrylate, 3,4-epoxycyclohexylpropyl (meth)acrylate, allyl glycidyl ether, etc.

(xv) (Meth)acrylates having alkoxy-terminated polyoxyethylene chains.

(xvi) Sulfonic group-containing polymerizable unsaturated monomers: 2-acrylamide-2-methylpropanesulfonic acid, 2-sulfoethyl (meth)acrylate, allylsulfonic acid, 4-styrenesulfonic acid, etc.; sodium salts and ammonium salts of such sulfonic acids; etc.

(xvii) Polymerizable unsaturated monomers having UV-absorbing functional groups: 2-hydroxy-4-(3-methacryloyloxy-2-hydroxypropoxy)benzophenone, 2-hydroxy-4-(3-acryloyloxy-2-hydroxypropoxy)benzophenone, 2,2'-dihydroxy-4-(3-methacryloyloxy-2-hydroxypropoxy)benzophenone, 2,2'-dihydroxy-4-(3-acryloyloxy-2-hydroxypropoxy)benzophenone, 2-(2'-hydroxy-5'-methacryloyloxyethylphenyl)-2H-benzotriazole, etc.

(xviii) UV-stable polymerizable unsaturated monomers: 4-(meth)acryloyloxy-1,2,2,6,6-pentamethylpiperidine, 4-(meth)acryloyloxy-2,2,6,6-tetramethylpiperidine, 4-cyano-4-(meth)acryloylamino-2,2,6,6-tetramethylpiperidine, 1-(meth)acryloyl-4-(meth)acryloylamino-2,2,6,6-tetramethylpiperidine, 1-(meth)acryloyl-4-cyano-4-(meth)acryloylamino-2,2,6,6-tetramethylpiperidine, 4-crotonoyloxy-2,2,6,6-tetramethylpiperidine, 4-crotonylamino-2,2,6,6-tetramethylpiperidine, 1-crotonoyl-4-crotonoyloxy-2,2,6,6-tetramethylpiperidine, etc.

(xix) Carbonyl group-containing polymerizable unsaturated monomer compounds: acrolein, diacetone acrylamide, diacetone methacrylamide, acetoacetoxylethyl methacrylate, formylstyrene, $C_{4-7}$ vinyl alkyl ketones (e.g., vinyl methyl ketone, vinyl ethyl ketone, vinyl butyl ketone), etc.

To inhibit hydrogen gas generation from the coating composition, it is preferable to use a hydrophobic polymerizable unsaturated monomer as at least one of the other polymerizable unsaturated monomer(s) (b).

The hydrophobic polymerizable unsaturated monomer is a polymerizable unsaturated monomer containing a linear, branched or cyclic saturated or unsaturated hydrocarbon group containing 6 or more carbon atoms, excluding monomers containing a hydrophilic group, such as hydroxy-containing polymerizable unsaturated monomers. Examples of hydrophobic polymerizable unsaturated monomers include n-hexyl (meth)acrylate, octyl (meth)acrylate, 2-ethylhexyl (meth)acrylate, nonyl (meth)acrylate, tridecyl (meth)acrylate, lauryl (meth)acrylate, stearyl (meth)acrylate, isostearyl (meth)acrylate, cyclohexyl (meth)acrylate, methylcyclohexyl (meth)acrylate, t-butylcyclohexyl (meth)acrylate, cyclododecyl (meth)acrylate, and like alkyl or cycloalkyl (meth)acrylates; isobornyl (meth)acrylate and like isobornyl group-containing polymerizable unsaturated monomers; adamantyl (meth)acrylate and like adamantyl group-containing polymerizable unsaturated monomers; benzyl (meth)acrylate, styrene, α-methylstyrene, vinyltoluene, and like aromatic ring-containing polymerizable unsaturated monomers; etc. These can be used singly or in a combination of two or more. In particular, to inhibit hydrogen gas generation and to improve the water resistance of the resulting coating film, it is preferable to use, as the hydrophobic polymerizable unsaturated monomer, an aromatic ring-containing polymerizable unsaturated monomer, and more preferably styrene.

The proportion of the hydrophobic polymerizable unsaturated monomer is preferably about 5 to about 80 mass %, more preferably about 20 to about 70 mass %, even more preferably about 36 to about 65 mass %, and most preferably about 40 to about 60 mass %, based on the total amount of the phosphoric acid group-containing polymerizable unsaturated monomer (a) and other polymerizable unsaturated monomer(s) (b). It is particularly preferable to use styrene as a hydrophobic polymerizable unsaturated monomer in a proportion of about 5 to about 80 mass %, more preferably about 10 to about 70 mass %, even more preferably about 20 to about 65 mass %, and most preferably about 36 to about 60 mass %, based on the total amount of the phosphoric acid group-containing polymerizable unsaturated monomer (a) and other polymerizable unsaturated monomer(s) (b)

From the viewpoint of coating film performance, it is preferable that the phosphoric acid group-containing resin (C) reacts with the curing agent (B) (e.g., an amino resin, blocked or unblocked polyisocyanate compound, oxazoline group-containing compound, carbodiimide group-containing compound, or the like), and is thereby incorporated into the crosslinked/cured coating film. It is therefore preferable to use a hydroxy-containing polymerizable unsaturated monomer and/or carboxy-containing polymerizable unsaturated monomer as at least one of the other polymerizable unsaturated monomer(s) (b).

Specific examples of hydroxy-containing polymerizable unsaturated monomers are the same as mentioned in (x) above. It is particularly preferable to use, as the hydroxy-containing polymerizable unsaturated monomer, 2-hydroxyethyl (meth)acrylate, 4-hydroxybutyl (meth)acrylate, ε-caprolactone-modified product of 2-hydroxyethyl (meth)acrylate, or the like.

To suppress reactions of metallic pigments with water and to improve the water resistance of the resulting coating film, it is preferable to use the hydroxy-containing polymerizable unsaturated monomer in an amount such that the resulting phosphoric acid group-containing resin (C) has a hydroxy value of about 15 to about 200 mg KOH/g, and more preferably about 20 to about 140 mg KOH/g. It is particularly preferable that the hydroxy-containing polymerizable unsaturated monomer be used in an amount such that the resin (C) has a hydroxy value of about 30 to about 100 mg KOH/g, and even more preferably about 40 to about 90 mg KOH/g.

The proportion of the hydroxy-containing polymerizable unsaturated monomer is preferably about 1 to about 40 mass %, and more preferably about 2 to about 30 mass %, and even more preferably about 5 to about 25 mass %, based on the total amount of the phosphoric acid group-containing polymerizable unsaturated monomer (a) and other polymerizable unsaturated monomer(s) (b).

Specific examples of carboxy-containing polymerizable unsaturated monomers are the same as mentioned in (xi) above. It is particularly preferable to use (meth)acrylic acid or the like as a carboxy-containing polymerizable unsaturated monomer.

The proportion of carboxy-containing polymerizable unsaturated monomer is about 0 to about 30 mass %, more preferably about 1 to about 20 mass %, and even more preferably about 2 to about 10 mass %, based on the total amount of the phosphoric acid group-containing polymerizable unsaturated monomer (a) and other polymerizable unsaturated monomer(s) (b).

The phosphoric acid group-containing resin (C) can be obtained by copolymerizing the phosphoric acid group-containing polymerizable unsaturated monomer (a) with other polymerizable unsaturated monomer(s) (b). The proportions of the phosphoric acid group-containing polymerizable unsaturated monomer (a) and other polymerizable unsaturated monomer(s) (b) are suitably selected according to the properties desired of the resin (C), and other factors. It is usually preferable that the mass ratio of the phosphoric acid group-containing polymerizable unsaturated monomer (a) relative to other polymerizable unsaturated monomer(s) (b) is about 10/90 to about 70/30, more preferably about 15/85 to about 60/40, and even more preferably about 20/80 to about 55/45.

The copolymerization of the phosphoric acid group-containing polymerizable unsaturated monomer (a) with other polymerizable unsaturated monomer(s) (b) can be carried out using known methods such as solution polymerization in an organic solvent, emulsion polymerization in an aqueous media, etc., among which solution polymerization is preferable.

When solution polymerization is employed, the copolymerization can be carried out, for example, by dissolving or dispersing a mixture of the phosphoric acid group-containing polymerizable unsaturated monomer (a), other polymerizable unsaturated monomer(s) (b), and radical polymerization initiator, in an organic solvent, and heating the solution or dispersion while stirring at about 80 to about 200° C. for about 1 to about 10 hours.

Examples of organic solvents that can be used in the above copolymerization reaction include heptane, toluene, xylene, octane, mineral spirits, and like hydrocarbon solvents; ethyl acetate, n-butyl acetate, isobutyl acetate, ethylene glycol monomethyl ether acetate, diethylene glycol monobutyl ether acetate, and like ester solvents; methyl ethyl ketone, methyl isobutyl ketone, diisobutyl ketone, cyclohexanone, and like ketone solvents; methanol, ethanol, isopropanol, n-butanol, sec-butanol, isobutanol, and like alcohol solvents; n-butyl ether, dioxane, ethylene glycol monomethyl ether, ethylene glycol monobutyl ether, propylene glycol methyl ether, propylene glycol monopropyl ether, propylene glycol monobutyl ether, dipropylene glycol monomethyl ether, dipropylene glycol monobutyl ether, tripropylene glycol monomethyl ether, and like ether solvents; N,N-dimethylacetamide, N,N-dimethylformamide, N-methyl-2-pyrrolidone, N,N-dimethyl-β-methoxypropionamide, and like amide solvents; 1,3-dimethyl-2-imidazolidinone, and like urea solvents; dimethyl sulfoxide and like sulfoxide solvents; tetramethylene sulfone and like sulfone solvents; "Swasol 310", "Swasol 1000", and "Swasol 1500" (tradenames of Maruzen Petrochemical Co., Ltd.), and like aromatic petroleum solvents; etc. Such organic solvents can be used singly or in a combination of two or more. The amount of organic solvent used for the solution polymerization is preferably not more than 400 parts by mass per 100 parts by mass of the monomers (a) and (b) combined.

Examples of the radical polymerization initiator include cyclohexanone peroxide, 3,3,5-trimethylcyclohexanone peroxide, methylcyclohexanone peroxide, and like ketone peroxides; 1,1-bis(tert-butylperoxy)-3,3,5-trimethylcyclohexane, 1,1-bis(tert-butylperoxy)cyclohexane, n-butyl-4,4-bis(tert-butylperoxy)valerate, and like peroxyketals; cumene hydroperoxide, 2,5-dimethylhexane-2,5-dihydroperoxide, and like hydroperoxides; 1,3-bis(tert-butylperoxy-m-isopropyl)benzene, 2,5-dimethyl-2,5-di(tert-butylperoxy)hexane, diisopropylbenzene peroxide, tert-butyl cumyl peroxide, and like dialkyl peroxides; decanoyl peroxide, lauroyl peroxide, benzoyl peroxide, 2,4-dichlorobenzoyl peroxide, and like diacyl peroxides; bis(tert-butylcyclohexyl) peroxydicarbonate, and like peroxycarbonates; tert-butylperoxybenzoate, 2,5-dimethyl-2,5-di(benzolyperoxy)hexane, and like organic peroxide polymerization initiators; 2,2'-azobisisobutyronitrile, 1,1-azobis(cyclohexane-1-carbonitrile), azocumene-2, 2'-azobismethylvaleronitrile, 4,4'-azobis(4-cyanovaleric acid), and like azo polymerization initiators; etc. The amount of radical polymerization initiator is not limited, but is preferably about 0.1 to about 15 parts by mass, and more preferably about 0.3 to about 10 parts by mass, per 100 parts by mass of the monomers (a) and (b) combined.

In the above polymerization reaction, the method for adding the monomer components and polymerization initiator is not limited, but, for example, it is more advantageous to add the polymerization initiator dropwise in several portions throughout the polymerization from the early stage to the latter stage, than to add it at once in the early stage of the polymerization, from the viewpoint of ease of controlling the temperature in the polymerization reaction, inhibition of the formation of undesired crosslinked gels, etc.

The phosphoric acid group-containing resin (C) thus obtained has an acid value of about 10 to about 200 mg KOH/g. The acid value of the resin (C) is preferably about 40 to about 170 mg KOH/g, and more preferably about 70 to about 150 mg KOH/g. The resin (C) preferably has a hydroxy value of about 15 to about 200 mg KOH/g, more preferably about 20 to about 140 mg KOH/g, even more preferably about 30 to about 100 mg KOH/g, and most preferably about 40 to about 90 mg KOH/g. The resin (C) preferably has a number average molecular weight of about 2,000 to about 100,000, more preferably about 4,000 to about 50,000, and still more preferably about 8,000 to about 30,000.

To achieve excellent storage stability and excellent water resistance of the coating film, the proportion of phosphoric acid group-containing resin (C) is preferably about 0.1 to about 40 parts by mass, more preferably about 1 to about 25 parts by mass, and even more preferably about 2 to about 15 parts by mass, per 100 parts by mass of the aqueous film-forming resin (A) and curing agent (B) combined.

Nitrogen-Containing Compound (D)

The coating composition of the present invention comprises as an essential ingredient a nitrogen-containing compound (D) represented by the following formula (2):

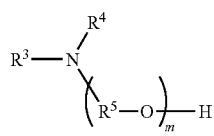

(2)

wherein $R^3$ represents a $C_{4\text{-}22}$ monovalent organic group, $R^4$ represents a $C_{4\text{-}22}$ hydrocarbon group, $C_{4\text{-}22}$ acyl group, or

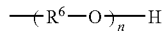

($R^6$ represents a $C_{2\text{-}10}$ alkylene group, and n represents an integer of 0 to 100, provided that when n is 2 or more, the plurality of $R^6$'s may be the same or different), $R^5$ represents a $C_{2\text{-}10}$ alkylene group, and m represents an integer of 1 to 100, provided that when m is 2 or more, the plurality of $R^5$'s may be the same or different.

Examples of $C_{4\text{-}22}$ monovalent organic groups represented by $R^3$ include $C_{4\text{-}22}$ hydrocarbon groups, $C_{4\text{-}22}$ acyl groups, etc.

Alkylene groups represented by $R^5$ and $R^6$ may each be a straight alkylene group or a branched alkylene group. The alkylene group preferably has 2 to 4 carbon atoms, more preferably 2 or 3 carbon atoms, and still more preferably 2 carbon atoms.

m is preferably an integer of 1 to 50, more preferably an integer of 1 to 25, still more preferably an integer of 2 to 15, and most preferably an integer of 3 to 10. n is preferably an integer of 0 to 50, more preferably an integer of 1 to 25, still more preferably an integer of 2 to 15, and most preferably an integer of 3 to 10.

The nitrogen-containing compound (D) is not limited insofar as it is a nitrogen-containing compound represented by the above formula (2). As the compound (D), for example, nitrogen-containing compounds (D1) to (D4) described below are preferable.

Nitrogen-Containing Compound (D1)

A nitrogen-containing compound (D1) is represented by the following formula (7):

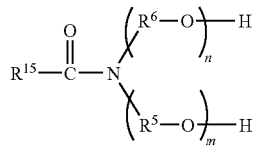

(7)

wherein $R^{15}$ represents a $C_{3\text{-}21}$ hydrocarbon group, and $R^5$, $R^6$, m, and n are as defined above, provided that $1 \leq m+n \leq 100$.

To obtain a coating film with excellent smoothness, finished appearance, and water resistance, $R^{15}$ is desirably an alkyl or alkenyl group having 3 to 21 carbon atoms, preferably 6 to 18 carbon atoms, and more preferably 8 to 14 carbon atoms. An alkyl group having 6 to 18 carbon atoms, especially 8 to 14 carbon atoms, is particularly preferable.

To obtain a coating film with excellent smoothness and luster, $R^5$ and $R^6$ are each preferably an alkylene group having 2 to 4 carbon atoms, more preferably an alkylene group having 2 or 3 carbon atoms, and still more preferably an alkylene group having 2 carbon atoms (ethylene).

Further, to obtain a coating film with excellent smoothness, luster, and water resistance, the sum (m+n) of the molar numbers of the added alkylene oxides in the above formula (7) is 1 to 100, preferably 2 to 50, more preferably 3 to 30, and still more preferably 4 to 20.

The nitrogen-containing compound (D1) can be produced, for example, by reacting a fatty acid or fatty acid ester with ammonia to synthesize an aliphatic amide, and then reacting the obtained aliphatic amide with one or more alkylene oxides.

Examples of usable fatty acids include n-pentanoic acid, n-hexanoic acid, n-heptanoic acid, n-octanoic acid, n-nonoic acid, capric acid, lauric acid, myristic acid, palmitic acid, stearic acid, oleic acid, coconut oil fatty acid, tallow fatty acid, palm oil fatty acid, palm kernel oil fatty acid, etc. Examples of usable fatty acid esters include methyl esters and ethyl esters of these fatty acids, etc.

Examples of usable alkylene oxides include ethylene oxide, propylene oxide, butylene oxide, etc. It is especially preferable to use ethylene oxide and/or propylene oxide, and more preferably ethylene oxide. In the addition reaction of alkylene oxides, it is preferable to use a basic catalyst such as sodium hydroxide, potassium hydroxide, and like metal hydroxides; sodium methylate; and amine, in a proportion of about 0.01 to about 5 mol % based on the aliphatic amide.

The sum (m+n) of molar numbers of the added alkylene oxides can be adjusted by adjusting, in the above reaction of an aliphatic amide with alkylene oxide(s), the mixing ratio (molar ratio) between the aliphatic amide and the alkylene oxide(s). For example, the sum (m+n) of the average molar numbers of the added alkylene oxides in the nitrogen-containing compound (D1) obtained by reacting 20 mol of the above alkylene oxide(s) with 1 mol of the above aliphatic amide is 20.

Nitrogen-Containing Compound (D2)

A nitrogen-containing compound (D2) is represented by the following formula (8):

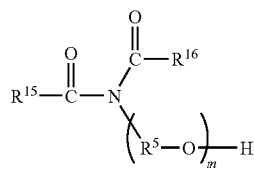

(8)

wherein $R^{15}$ and $R^{16}$ independently represent a $C_{3\text{-}21}$ hydrocarbon group, and $R^5$ and m are as defined above.

To obtain a coating film with excellent smoothness, luster, finished appearance, and water resistance, $R^{15}$ and $R^{16}$ are each desirably an alkyl or alkenyl group having 3 to 21 carbon atoms, preferably 6 to 18 carbon atoms, and more preferably 8 to 14 carbon atoms. An alkyl group having 6 to 18 carbon atoms, especially 8 to 14 carbon atoms, is particularly preferable.

To obtain a coating film with excellent smoothness and luster, $R^5$ is preferably an alkylene group having 2 to 4 carbon atoms, more preferably an alkylene group having 2 or 3 carbon atoms, and still more preferably an alkylene group having 2 carbon atoms (ethylene).

To obtain a coating film with excellent smoothness, luster, and water resistance, the molar number m of the added alkylene oxides in the above formula (8) is 1 to 100, preferably 2 to 50, more preferably 3 to 30, and still more preferably 4 to 20.

The above nitrogen-containing compound (D2) can be obtained, for example, by reacting a secondary aliphatic amide with one or more alkylene oxides.

Examples of usable alkylene oxides include ethylene oxide, propylene oxide, butylene oxide, etc. It is especially preferable to use ethylene oxide and/or propylene oxide, and more preferably ethylene oxide.

The molar number m of the added alkylene oxides can be adjusted by adjusting, in the above addition reaction of alkylene oxide(s) to an aliphatic amide, the mixing ratio (molar ratio) between the aliphatic amide and the alkylene oxide(s).

Nitrogen-Containing Compound (D3)

A nitrogen-containing compound (D3) is represented by the following formula (9):

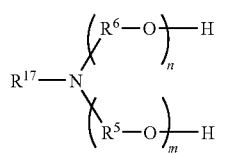

(9)

wherein $R^{17}$ represents a $C_{4-22}$ hydrocarbon group, and $R^5$, $R^6$, m, and n are as defined above.

To obtain a coating film with excellent smoothness, luster, finished appearance, and water resistance, $R^{17}$ is desirably an alkyl or an alkenyl group having 4 to 22 carbon atoms, preferably 6 to 18 carbon atoms, and more preferably 8 to 14 carbon atoms. An alkyl group having 6 to 18 carbon atoms, especially 8 to 14 carbon atoms, is particularly preferable.

To obtain a coating film with excellent smoothness and luster, $R^5$ and $R^6$ are each preferably an alkylene group having 2 to 4 carbon atoms, more preferably an alkylene group having 2 or 3 carbon atoms, and still more preferably an alkylene group having 2 carbon atoms (ethylene).

To obtain a coating film with excellent smoothness, luster, and water resistance, the sum (m+n) of the molar numbers of the added alkylene oxides in the above formula (9) is 1 to 100, preferably 2 to 50, more preferably 3 to 30, and still more preferably 4 to 20.

The nitrogen-containing compound (D3) can be produced, for example, by heating a fatty acid or a fatty acid ester and ammonia to produce an aliphatic nitrile, then reducing the aliphatic nitrile with hydrogen to synthesize an aliphatic amine, and reacting the obtained aliphatic amine with one or more alkylene oxides.

Specific examples of usable fatty acids include n-pentanoic acid, n-hexanoic acid, n-heptanoic acid, n-octanoic acid, n-nonoic acid, capric acid, lauric acid, myristic acid, palmitic acid, stearic acid, oleic acid, coconut oil fatty acid, tallow fatty acid, palm oil fatty acid, palm kernel oil fatty acid, etc. Examples of usable fatty acid esters include methyl esters and ethyl esters of these fatty acids, etc.

Examples of usable alkylene oxides include ethylene oxide, propylene oxide, butylene oxide, etc. It is especially preferable to use ethylene oxide and/or propylene oxide, and more preferably ethylene oxide. In the above reaction of an aliphatic amine with alkylene oxide(s), it is preferable to use a basic catalyst such as sodium hydroxide, potassium hydroxide, and like metal hydroxides; sodium methylate; and amine, in a proportion of about 0.01 to about 5 mol % based on the aliphatic amine.

The sum (m+n) of the molar number of the added alkylene oxides can be adjusted by adjusting, in the above reaction of an aliphatic amine with alkylene oxide(s), the mixing ratio (molar ratio) between the aliphatic amine and the alkylene oxide(s).

Nitrogen-Containing Compound (D4)

A nitrogen-containing compound (D4) is represented by the following formula (10):

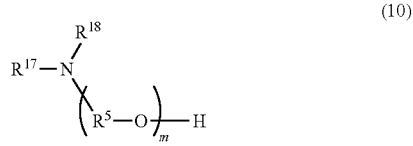

(10)

wherein $R^{17}$ and $R^{18}$ independently represent a $C_{4-22}$ hydrocarbon group, and $R^5$ and m are as defined above.

To obtain a coating film with excellent smoothness, luster, finished appearance, and water resistance, $R^{17}$ and $R^{18}$ are each desirably an alkyl or alkenyl group having 4 to 22 carbon atoms, preferably 6 to 18 carbon atoms, and more preferably 8 to 14 carbon atoms. An alkyl group having 6 to 18 carbon atoms, especially 8 to 14 carbon atoms, is particularly preferable.

To obtain a coating film with excellent smoothness and luster, $R^5$ is preferably an alkylene group having 2 to 4 carbon atoms, more preferably an alkylene group having 2 or 3 carbon atoms, and still more preferably an alkylene group having 2 carbon atoms (ethylene).

To obtain a coating film with excellent smoothness, luster, and water resistance, the molar number m of the added alkylene oxides in the above formula (10) is 1 to 100, preferably 2 to 50, more preferably 3 to 30, and still more preferably 4 to 20.

The nitrogen-containing compound (D4) can be obtained, for example, by reacting a secondary aliphatic amine with one or more alkylene oxides.

Examples of usable alkylene oxides include ethylene oxide, propylene oxide, butylene oxide, etc. It is especially preferable to use ethylene oxide and/or propylene oxide, and more preferably ethylene oxide.

The molar number m of the added alkylene oxides in the nitrogen-containing compound (D4) can be adjusted by adjusting, in the above addition reaction of alkylene oxide(s) to an aliphatic amine, the mixing ratio (molar ratio) between the aliphatic amine and the alkylene oxide(s).

The molecular weight of the nitrogen-containing compound (D) used in the present invention is preferably about 100 to about 4,000, more preferably about 200 to about 2,000, and still more preferably about 300 to about 1,500. The HLB value of the compound (D) is preferably about 8 to about 18, more preferably about 10 to about 17, and still more preferably about 13 to about 16.

The HLB value of the nitrogen-containing compound (D) is a value calculated using Griffin's equation based on a mass fraction:

$$HLB\ value = 20 \times (MH/M)$$

wherein MH represents the molecular weight of the hydrophilic group moiety of the nitrogen-containing compound (D), and M represents the molecular weight of the nitrogen-containing compound (D).

To improve the smoothness and water resistance of a coating film, the proportion of the nitrogen-containing compound (D) is preferably about 1 to about 30 parts by mass, more preferably about 3 to about 20 parts by mass, and still more preferably about 5 to about 15 parts by mass, per 100 parts by mass in total of the aqueous film-forming resin (A) and the curing agent (B).

Metallic Pigment (E)

A metallic pigment (E) provides a coating film with brilliant luster or iridescence, and may be any known pigment.

As the metallic pigment (E), aluminium, evaporated aluminium, copper, zinc, brass, nickel, aluminium oxide, mica, aluminium oxide coated with titanium oxide or iron oxide, mica coated with titanium oxide or iron oxide, etc., are usable. These metallic pigments can be used singly or in a combination of two or more. As the metallic pigment (E), an aluminium pigment is especially preferable. There are two kinds of aluminium pigments, i.e., non-leafing aluminium and leafing aluminium, and either can be used herein.

The metallic pigment (E) preferably has a scale-like shape. Such a scaly metallic pigment preferably has a length in the longitudinal direction of about 1 to about 100 μm, especially about 5 to about 40 μm, and a thickness of about 0.0001 to about 5 μm, especially about 0.001 to about 2 μm.

To improve luster and water resistance, the proportion of the metallic pigment (E) is preferably about 1 to about 60 parts by mass, more preferably about 2 to about 40 parts by mass, and still more preferably about 5 to about 30 parts by mass, per 100 parts by mass in total of the aqueous film-forming resin (A) and the curing agent (B).

Other Components

To improve luster, the aqueous metallic coating composition of the present invention preferably contains a hydrophobic solvent (F).

The hydrophobic solvent (F) is desirably an organic solvent, the mass of which that dissolves in 100 g of water at 20° C. is 10 g or less, preferably 5 g or less, and more preferably 1 g or less. Examples of usable organic solvents include hydrocarbon solvents such as gasoline, mineral spirits, toluene, xylene, solvent naphtha, etc.; alcohol solvents such as n-hexanol, n-octanol, 2-octanol, 2-ethylhexanol, n-decanol, benzyl alcohol, ethylene glycol mono-2-ethylhexyl ether, propylene glycol mono-n-butyl ether, dipropylene glycol mono-n-butyl ether, tripropylene glycol mono-n-butyl ether, propylene glycol mono-2-ethylhexyl ether, propylene glycol monophenyl ether, etc.; ester solvents such as n-butyl acetate, isobutyl acetate, isoamyl acetate, methylamyl acetate, ethylene glycol acetate monobutyl ether, etc.; and ketone solvents such as methyl isobutyl ketone, cyclohexanone, ethyl n-amyl ketone, diisobutyl ketone, etc. Such solvents can be used singly or in a combination of two or more.

To obtain a coating film with excellent luster, it is preferable to use a hydrophobic alcohol solvent as the hydrophobic solvent (F). It is especially preferable to use a $C_{7-14}$ hydrophobic alcohol solvent, and more preferably at least one hydrophobic alcohol solvent selected from the group consisting of n-octanol, 2-octanol, 2-ethyl-1-hexanol, ethylene glycol mono-2-ethylhexyl ether, propylene glycol mono-n-butyl ether, and dipropylene glycol mono-n-butyl ether.

When the coating composition of the present invention contains the hydrophobic solvent (F), the proportion thereof is preferably about 10 to about 100 parts by mass, more preferably about 15 to about 80 parts by mass, and still more preferably about 20 to about 60 parts by mass, per 100 part by mass of the total solids of the aqueous film-forming resin (A), the curing agent (B), the phosphoric acid group-containing resin (C), the nitrogen-containing compound (D), and the metallic pigment (E).

If necessary, the aqueous metallic coating composition of the present invention may contain additives for coating compositions such as coloring pigments, extender pigments, thickening agents, curing catalysts, UV absorbers, light stabilizers, antifoaming agents, plasticizers, organic solvents other than the above hydrophobic solvents, surface control agents, antisettling agents, etc.

Examples of coloring pigments include titanium oxide, zinc oxide, carbon black, molybdenum red, chromium oxide, Prussian blue, cobalt blue, azo pigments, phthalocyanine pigments, quinacridone pigments, isoindoline pigments, threne pigments, perylene pigments, etc. Examples of extender pigments include talc, clay, kaolin, baryta, barium sulfate, barium carbonate, calcium carbonate, silica, alumina white, etc.

Examples of thickening agents include inorganic thickening agents such as silicate, metal silicate, montmorillonite, colloidal alumina, etc.; polyacrylic acid thickening agents such as a copolymer of (meth)acrylic acid and (meth)acrylic ester, sodium polyacrylate, etc.; associative thickening agents having a hydrophilic moiety and a hydrophobic moiety per molecule, and which, in an aqueous medium, effectively increase the viscosity by adsorption of the hydrophobic moiety on the surface of pigments or emulsion particles in a coating composition, or by association between hydrophobic moieties; cellulose derivative thickening agents such as carboxymethylcellulose, methylcellulose, hydroxyethylcellulose, etc.; protein thickening agents such as casein, sodium caseinate, ammonium caseinate, etc.; alginate thickening agents such as sodium alginate, etc; polyvinyl thickening agents such as polyvinyl alcohol, polyvinylpyrrolidone, polyvinyl benzyl ether copolymers, etc.; polyether thickening agents such as pluronic polyether, polyether dialkyl ester, polyether dialkyl ether, polyether epoxy-modified products, etc.; maleic anhydride copolymer thickening agents such as partial esters of a copolymer of vinyl methyl ether and maleic anhydride, etc.; polyamide thickening agents such as polyamide amine salts, etc.; and the like. Such thickening agents can be used singly or in a combination of two or more.

Examples of usable polyacrylic acid thickening agents include commercially available products, which are available, for example, under the tradenames "PRIMAL ASE-60", "PRIMAL TT-615", and "PRIMAL RM-5", manufactured by Rohm and Haas; "SN thickener 613", "SN thickener 618", "SN thickener 630", "SN thickener 634", and "SN thickener 636", manufactured by San Nopco Ltd.; and the like. Examples of usable associative thickening agents include commercially available products, which are available, for example, under the tradenames "UH-420", "UH-450", "UH-462", "UH-472", "UH-540", "UH-752", "UH-756VF", and "UH-814N", manufactured by ADECA Co. Ltd.; "PRIMAL RM-8W", "PRIMAL RM-825", "PRIMAL RM-2020NPR", "PRIMAL RM-12W", and "PRIMAL SCT-275", manufactured by Rohm and Haas; "SN thickener 612", "SN thickener 621N", "SN thickener 625N", "SN thickener 627N", and "SN thickener 660T", manufactured by San Nopco Ltd.; and the like.

As a thickening agent, it is preferable to use a polyacrylic acid thickening agent and/or an associative thickening agent, more preferably an associative thickening agent, and still more preferably a urethane associative thickening agent bearing a hydrophobic group at end(s), and which has a urethane bond in a molecular chain. Examples of usable urethane associative thickening agents include commercially available products, which are available, for example, under the tradenames "UH-420", "UH-462", "UH-472", "UH-540", "UH-752", "UH-756VF", and "UH-814N", manufactured by ADEKA Co. Ltd.; "SN thickener 612", "SN thickener 621N", "SN thickener 625N", "SN thickener 627N", and "SN thickener 660T", manufactured by San Nopco Ltd.; and the like.

When the coating composition of the present invention comprises a thickening agent as described above, the proportion thereof is preferably about 0.01 to about 10 parts by mass, more preferably about 0.05 to about 3 parts by mass, and still more preferably about 0.1 to about 2 parts by mass, per 100 parts by mass of the total solids of the aqueous film-forming resin (A), the curing agent (B), the phosphoric acid group-containing resin (C), the nitrogen-containing compound (D), and the metallic pigment (E).

Preparation of Coating Composition

The aqueous metallic coating composition of the present invention can be prepared by mixing and dispersing, in an aqueous medium, an aqueous film-forming resin (A), a curing agent (B), a phosphoric acid group-containing resin (C), a nitrogen-containing compound (D), and a metallic pigment (E), together with, if necessary, a hydrophobic solvent (F) and other additives for coating compositions, using a known method. Usable aqueous media include deionized water and a mixture of deionized water and hydrophilic organic solvent. Examples of hydrophilic organic solvents include propylene glycol monomethyl ether, etc.

In the above mixing, it is preferable that the phosphoric acid group-containing resin (C) and the metallic pigment (E) be premixed to prepare a pigment dispersion, and the obtained pigment dispersion be mixed and dispersed in an aqueous medium with the aqueous film-forming resin (A), the curing agent (B), the nitrogen-containing compound (D), etc.

Usually, the solids content of the coating composition of the present invention is preferably about 5 to about 40% by mass, more preferably about 15 to about 35% by mass, and still more preferably about 20 to about 30% by mass.

Coating Film Formation Method

When applied to various substrates, the coating composition of the present invention can form a metallic coating film with excellent appearance.

Substrate

The substrate to be coated with the coating composition of the present invention is not limited. Examples of usable substrates include exterior panel parts of automotive bodies such as passenger cars, tracks, motorcycles, buses, etc.; automotive components; exterior panel parts of household electric appliances such as cellular phones, audiovisual apparatus, etc.; and the like. The exterior panel part of an automotive body and an automotive component are especially preferable.

Materials for these substrates are not limited. Examples thereof include metallic materials such as iron, aluminium, brass, copper, tin plate, stainless steel, galvanized steel, steels plated with zinc alloy (Zn—Al, Zn—Ni, Zn—Fe, etc.); plastic materials such as polyethylene resin, polypropylene resin, acrylonitrile-butadiene-styrene (ABS) resin, polyamide resin, acryl resin, vinylidene chloride resin, polycarbonate resin, polyurethane resin, epoxy resin, and like resins, various kinds of FRP, etc.; inorganic materials such as glass, cement, concrete, etc.; wood; textile materials such as paper, cloth, etc.; and the like. Metallic materials and plastic materials are especially preferable.

The substrate may be any of those obtained by surface-treating a metallic surface of a metal substrate such as the exterior panel part of an automotive body, a household electric appliance, a steel plate that forms such a part or appliance, etc., with phosphate, chromate, composite oxide, etc. The substrate may have an undercoating of any of various electrodeposition coating compositions, etc., and/or an intermediate coating formed on the metallic surface.

Coating Method

The method of applying the coating composition of the invention is not limited. For example, air spray coating, airless spray coating, rotary atomization coating, curtain coating and like application methods can be used to form a wet coating. Air spray coating, rotary atomization coating, and the like are preferable. Upon application of the coating composition, an electrostatic charge may be applied, if necessary.

The coating composition of the present invention is preferably applied to a film thickness of about 5 to about 70 μm (when cured).

A wet coating can be cured by applying the coating composition of the present invention to a substrate and then heating the same. Heating can be performed by known heating means. For example, drying furnaces such as hot air furnaces, electric furnaces, infrared induction heating furnaces and the like can be used. The heating temperature is preferably about 80 to about 180° C., more preferably about 100 to about 170° C., and still more preferably about 120 to about 160° C. The heating time is not limited, and is preferably about 10 to about 60 minutes, and more preferably about 20 to about 40 minutes.

In order to prevent deficiencies such as foaming on the coated surface, after application of the coating composition of the present invention, it is preferable to perform preheating, air blowing, etc., prior to the above heat-curing, under conditions in which the coating does not substantially cure. The preheating temperature is preferably about 40 to about 100° C., more preferably about 50 to about 90° C., and still more preferably about 60 to about 80° C. The preheating time is preferably about 30 seconds to about 15 minutes, more preferably about 1 to about 10 minutes, and still more preferably about 2 to about 5 minutes. Air blowing can be usually performed by blowing room temperature air or air heated to about 25 to about 80° C. over the coated surface of the substrate for about 30 seconds to about 15 minutes.

When forming a multilayer coating film comprising a base coating and a clear coating on a substrate such as an automotive body using the two-coat one-bake method, the aqueous metallic coating composition of the present invention can be suitably used to form a metallic base coating. The formation of a coating film in this case can be performed in accordance with the following method I.

Method I

A method for forming a coating film comprising:
(1) a step of applying the aqueous metallic coating composition of the present invention to a substrate to form a metallic base coating;
(2) a step of applying a clear coating composition to the uncured metallic base coating surface to form a clear coating; and
(3) a step of heating the uncured metallic base coating and the uncured clear coating to simultaneously cure the coatings.

A preferable example of the substrate in the above method I is an automotive body comprising an undercoating and/or an intermediate coating. The "uncured coating" encompasses a set-to-touch coating and a tack-free coating.

When applying the aqueous metallic coating composition of the present invention using the two-coat one-bake method of the above method I, it is preferably applied to a film thickness of about 5 to about 40 μm (when cured), more preferably about 10 to about 30 μm (when cured), and still more preferably about 10 to about 20 μm (when cured). The above clear coating composition is preferably applied to a film thickness of about 10 to about 80 μm (when cured), and more preferably about 15 to about 60 μm (when cured).

In method I, after application of the above aqueous metallic coating composition, in order to prevent deficiencies such as foaming on the coated surface, it is preferable to perform preheating, air blowing, etc., under conditions in which the coating film does not substantially cure. The preheating temperature is preferably about 40 to about 100° C., more preferably about 50 to about 90° C., and still more preferably about 60 to about 80° C. The preheating time is preferably about 30 seconds to about 15 minutes, more preferably about 1 to about 10 minutes, and still more preferably about 2 to about 5 minutes. Air blowing can be usually performed by blowing room temperature air or air heated to about 25 to about 80° C. over the coated surface of the substrate for about 30 seconds to about 15 minutes. After application of the above clear coating composition, if necessary, it is possible to have an interval of about 1 to about 60 minutes at room temperature, or perform preheating at about 40 to about 80° C. for about 1 to about 60 minutes.

The above aqueous metallic coating composition and clear coating composition can be cured using any of the above-described known heating means. The heating temperature is preferably about 80 to about 180° C., more preferably about 100 to about 170° C., and still more preferably about 120 to about 160° C. The heating time is preferably about 10 to about 60 minutes, and more preferably about 20 to about 40 minutes. This heating enables simultaneous curing of both coatings, i.e., a metallic base coating and a clear coating.

When forming a multilayer coating film comprising an intermediate coating, base coating, and clear coating on a substrate such as an automotive body using the three-coat one-bake method, the aqueous metallic coating composition of the present invention can be used for forming a metallic base coating. The formation of a coating film in this case can be performed in accordance with the following method II.

Method II

A method for forming a multilayer coating film comprising:
(1) a step of applying an intermediate coating composition to a substrate to form an intermediate coating;
(2) a step of applying the aqueous metallic coating composition of the present invention to the uncured intermediate coating surface to form a metallic base coating;
(3) a step of applying a clear coating composition to the uncured metallic base coating surface to form a clear coating; and
(4) a step of heating the uncured intermediate coating, the uncured metallic base coating, and the uncured clear coating to simultaneously cure the coatings.

The above method II utilizes the coating film formation method of method I on an uncured intermediate coating. A preferable example of the substrate in method II is an automotive body having an undercoating.

In method II, usually, the intermediate coating composition is preferably applied to a film thickness of about 10 about 60 μm (when cured), and more preferably about 20 to about 40 μm (when cured). Further, usually, the aqueous metallic coating composition of the present invention is preferably applied to a film thickness of about 5 to about 40 μm (when cured), more preferably about 10 to about 30 μm (when cured), and still more preferably about 10 to about 20 μm (when cured). Further, usually, the clear coating composition is preferably applied to a film thickness of about 10 to about 80 μm (when cured), and more preferably about 15 to about 60 μm (when cured).

In method II, when an aqueous coating composition is used as an intermediate coating composition, it is preferable to perform preheating after application of the coating composition. The preheating temperature is preferably about room temperature to about 100° C., more preferably about 40 to about 90° C., and still more preferably about 60 to about 80° C. The preheating time is preferably about 30 seconds to about 15 minutes, more preferably about 1 to about 10 minutes, and still more preferably about 2 to about 5 minutes.

It is preferable to perform preheating after application of the aqueous metallic coating composition. The preheating temperature is preferably about room temperature to about 100° C., more preferably about 40 to about 90° C., and still more preferably about 60 to about 80° C. The preheating time is preferably about 30 seconds to about 15 minutes, more preferably about 1 to about 10 minutes, and still more preferably about 2 to about 5 minutes.

After application of the clear coating composition, if necessary, it is possible to have an interval of about 1 to about 60 minutes at room temperature, or perform preheating at about 40 to about 80° C. for about 1 to about 60 minutes.

The three coatings, i.e., uncured intermediate coating, uncured base coating, and uncured clear coating, can be heat cured using any of the above-described known heating means. The heating temperature is preferably about 80 to about 180° C., more preferably about 100 to about 170° C., and still more preferably about 120 to about 160° C. The heating time is preferably about 10 to about 60 minutes, and more preferably about 20 to about 40 minutes. This heating enables simultaneous curing of the three coating films, i.e., intermediate coating, metallic base coating, and clear coating.

As the clear coating composition used in the above methods I and II, any known thermosetting clear coating compositions for coating an automotive body and the like can be used. Examples thereof include organic-solvent thermosetting coating compositions, aqueous thermosetting coating compositions, powder thermosetting coating compositions, which comprise a base resin having a crosslinkable functional group and a cross linking agent.

Examples of crosslinkable functional groups contained in a base resin include carboxy, hydroxy, epoxy, silanol, and the like. Examples of the kinds of base resin include acrylic resins, polyester resins, alkyd resins, urethane resins, epoxy resins, fluororesins, and the like. Examples of crosslinking agents include polyisocyanate compounds, blocked polyisocyanate compounds, melamine resins, urea resins, carboxy-containing compounds, carboxy-containing resins, epoxy-containing resins, epoxy-containing compounds, and the like.

The clear coating composition may be a one-component coating composition, and may also be a multi-package coating composition such as a two-component urethane resin coating composition.

The clear coating composition may contain a coloring pigment, luster pigment, dye, etc., as required without impairing the transparency of the clear coating composition. The clear coating composition may further suitably contain an extender pigment, UV absorber, light stabilizer, antifoaming agent, thickening agent, anticorrosive, surface control agent, etc.

Examples of preferable combinations of base resin/crosslinking agent for such a clear coating composition are carboxy-containing resin/epoxy-containing resin, hydroxy-containing resin/polyisocyanate compound, hydroxy-containing resin/blocked polyisocyanate compound, hydroxy-containing resin/melamine resin, and the like.

As an intermediate coating composition used in the above method II, any known thermosetting intermediate coating compositions can be used. Examples of suitable thermosetting coating compositions are those containing a base resin having a crosslinkable functional group, a crosslinking agent, a coloring pigment and an extender pigment.

Examples of crosslinkable functional groups contained in a base resin include carboxy, hydroxy, epoxy, and the like. Examples of the kinds of base resin include acrylic resins, polyester resins, alkyd resins, urethane resins and the like. Examples of usable crosslinking agents include melamine resins, polyisocyanate compounds, blocked polyisocyanate compounds, and the like.

The intermediate coating composition may be an organic-solvent coating composition, aqueous coating composition, or powder coating composition. Among these, an aqueous coating composition is preferable.

In the above methods I and II, the intermediate coating composition and clear coating composition can be applied using a known method such as air spray coating or airless spray coating.

EFFECTS OF THE INVENTION

The aqueous metallic coating composition of the present invention and the method for forming a multilayer coating film using the same achieve the following remarkable effects.

(1) The aqueous metallic coating composition of the present invention has excellent storage stability because the reaction between the metallic pigment and water is inhibited over a long period of time, and is capable of forming a coating film with excellent smoothness, luster, and water-resistant adhesion over a substrate.

The reason that the composition of the present invention has excellent storage stability, and is capable of forming a coating film with excellent smoothness, etc., is presumably as follows: a specific phosphoric acid group-containing resin firmly protects the surface of the metallic pigment in the composition of the present invention; and owing to the joint action of the phosphoric acid group-containing resin and a specific nitrogen-containing compound, the metallic pigment is uniformly dispersed in an aqueous medium.

(2) According to the method for forming a multilayer coating film of the present invention, it is possible to form a coating film with excellent smoothness, luster, and water-resistant adhesion over an automotive body or like substrate.

BEST MODE FOR CARRYING OUT THE INVENTION

The present invention will be described in more detail below with reference to Preparation Examples, Examples and Comparative Examples. However, the present invention is not limited to these Examples. In the Examples, "parts" and "percent" are expressed on a mass basis, unless otherwise specified. Thickness of coating film are based on cured coating films.

Preparation of Hydroxy-Containing Acrylic Resin (A1)

Preparation Example 1

A reaction vessel equipped with a thermometer, thermostat, stirrer, reflux condenser, nitrogen inlet tube and dropper was loaded with 130 parts of deionized water and 0.52 parts of polyoxyethylene alkylether sulfate ammonium salt (tradename "Aqualon KH-10", manufactured by Dai-Ichi Kogyo Seiyaku Co. Ltd., active ingredient: 97%). The mixture was stirred and mixed under a nitrogen stream, and was heated to 80° C.

A 1% portion of the total amount of monomer emulsion for a core portion described below and 5.3 parts of a 6% aqueous solution of ammonium persulfate were then introduced into the reaction vessel, and were retained at 80° C. for 15 minutes. The remainder of the monomer emulsion for the core portion was then added dropwise into the reaction vessel retained at the same temperature over 3 hours, and aged for 1 hour after the completion of the addition. A monomer emulsion for a shell portion described below was added dropwise over 1 hour, and was aged for 1 hour. Forty parts of a 5% aqueous solution of 2-(dimethylamino)ethanol was then gradually added into the reaction vessel while the mixture was cooled to 30° C. The reaction mixture was discharged while being filtrated with a nylon cloth, mesh size of 100, giving a dispersion of a core-shell-type water-dispersible hydroxy-containing acrylic resin (A1-1) having an average particle diameter of 100 nm, a solid content of 30%, an acid value of 33 mg KOH/g, and a hydroxy value of 25 mg KOH/g.

Monomer emulsion for the core portion: 42 parts of deionized water, 0.72 parts of "Aqualon KH-10", 2.1 parts of methylenebisacrylamide, 2.8 parts of styrene, 16.1 parts of methyl methacrylate, 28 parts of ethyl acrylate and 21 parts of n-butyl acrylate were mixed and stirred, giving a monomer emulsion for the core portion.

Monomer emulsion for the shell portion: 18 parts of deionized water, 0.31 parts of "Aqualon KH-10", 0.03 parts of ammonium persulfate, 5.1 parts of methacrylic acid, 5.1 parts of 2-hydroxyethyl acrylate, 3 parts of styrene, 6 parts of methyl methacrylate, 1.8 parts of ethyl acrylate and 9 parts of n-butyl acrylate were mixed and stirred, giving a monomer emulsion for the shell portion.

Preparation Examples 2 to 11

Dispersions of core-shell-type water-dispersible hydroxy-containing acrylic resins (A1-2) to (A1-11) were obtained in a manner similar to that in Preparation Example 1 except that the formulation ratios described in Table 1 shown below were used.

Table 1 shows the constitutional ratios (parts) of the starting materials, solid contents (%), acid values (mg KOH/g) and hydroxy values (mg KOH/g) of the dispersions of water-dispersible hydroxy-containing acrylic resins (A1-1) to (A1-11).

TABLE 1

|  | Preparation Example | | | | | |
|---|---|---|---|---|---|---|
|  | 1 | 2 | 3 | 4 | 5 | 6 |
| Name of hydroxy-containing acrylic resin | A1-1 | A1-2 | A1-3 | A1-4 | A1-5 | A1-6 |
| Deionized water | 130 | 130 | 130 | 130 | 130 | 130 |
| "Aqualon KH-10" | 0.52 | 0.52 | 0.52 | 0.52 | 0.52 | 0.52 |
| 6% Ammonium persulfate aqueous solution | 5.3 | 5.3 | 5.3 | 5.3 | 5.3 | 5.3 |

TABLE 1-continued

| | | | | | | | |
|---|---|---|---|---|---|---|---|
| Monomer emulsion for core portion | Deionized water | 42 | 42 | 42 | 42 | 42 | 42 |
| | "Aqualon KH-10" | 0.72 | 0.72 | 0.72 | 0.72 | 0.72 | 0.72 |
| | Methylene bisacrylamide | 2.1 | 2.1 | 2.1 | | 2.1 | 2.1 |
| | Allyl methacrylate | | | | 2.1 | | |
| | Acrylamide | | | | | | |
| | Styrene | 2.8 | 2.8 | 2.8 | 2.8 | 2.8 | 2.8 |
| | Methyl methacrylate | 16.1 | 16.1 | 16.1 | 16.1 | 16.1 | 16.1 |
| | Ethyl methacrylate | 28 | 28 | 28 | 28 | 28 | 28 |
| | n-Butyl acrylate | 21 | 21 | 21 | 21 | 21 | 21 |
| Monomer emulsion for shell portion | Deionized water | 18 | 18 | 18 | 18 | 18 | 18 |
| | "Aqualon KH-10" | 0.31 | 0.31 | 0.31 | 0.31 | 0.31 | 0.31 |
| | Ammonium persulfate | 0.03 | 0.03 | 0.03 | 0.03 | 0.03 | 0.03 |
| | Styrene | 3 | | 3 | 3 | 3 | 3 |
| | 2-Ethylhexyl acrylate | | 3 | 3.3 | | | |
| | 2-hydroxyethyl acrylate | 5.1 | 5.1 | 3 | 5.1 | 10.2 | 5.1 |
| | Methacrylic acid | 5.1 | 5.1 | 3 | 5.1 | 5.1 | 9 |
| | Methyl methacrylate | 6 | 6 | 6 | 6 | 6 | 6 |
| | Ethyl acrylate | 1.8 | 1.8 | 2.7 | 1.8 | 1.8 | 1.8 |
| | n-Butyl acrylate | 9 | 9 | 9 | 9 | 3.9 | 5.1 |
| | Allyl methacrylate | | | | | | |
| 5% Aqueous solution of 2-(dimethylamino) ethanol | | 40 | 40 | 40 | 40 | 40 | 40 |
| Solid content (%) | | 30 | 30 | 30 | 30 | 30 | 30 |
| Acid value (mg KOH/g) | | 33 | 33 | 20 | 33 | 33 | 59 |
| Hydroxy value (mg KOH/g) | | 25 | 25 | 15 | 25 | 49 | 25 |

| | | Preparation Example | | | | |
|---|---|---|---|---|---|---|
| | | 7 | 8 | 9 | 10 | 11 |
| Name of water-dispersible hydroxy-containing acrylic resin | | A1-7 | A1-8 | A1-9 | A1-10 | A1-11 |
| Deionized water | | 130 | 130 | 130 | 130 | 130 |
| "Aqualon KH-10" | | 0.52 | 0.52 | 0.52 | 0.52 | 0.52 |
| 6% Ammonium persulfate aqueous solution | | 5.3 | 5.3 | 5.3 | 5.3 | 5.3 |
| Monomer emulsion for core portion | Deionized water | 42 | 42 | 42 | 42 | 42 |
| | "Aqualon KH-10" | 0.72 | 0.72 | 0.72 | 0.72 | 0.72 |
| | Methylene bisacrylamide | 2.1 | 1.5 | 1.5 | | |
| | Allyl methacrylate | | 2.3 | | | 2.1 |
| | Acrylamide | | | | 2.1 | |
| | Styrene | 2.8 | 5.3 | 6.8 | 2.8 | 2.8 |
| | Methyl methacrylate | 16.1 | 44 | 18 | 16.1 | 16.1 |
| | Ethyl methacrylate | 28 | 11.3 | 26 | 28 | 28 |
| | n-Butyl acrylate | 21 | 10 | 22.5 | 21 | 21 |
| Monomer emulsion for shell portion | Deionized water | 18 | 18 | 18 | 18 | 18 |
| | "Aqualon KH-10" | 0.31 | 0.31 | 0.31 | 0.31 | 0.31 |
| | Ammonium persulfate | 0.03 | 0.03 | 0.03 | 0.03 | 0.03 |
| | Styrene | 3 | 3 | 2.3 | | |
| | 2-Ethylhexyl acrylate | | 6 | | 3 | |
| | 2-Hydroxyethyl acrylate | 5.1 | 2.3 | 2 | 5.1 | 5.1 |
| | Methacrylic acid | 5.1 | 3.3 | 4.3 | 5.1 | 5.1 |
| | Methyl methacrylate | 6 | 5 | 4.8 | 6 | 9 |
| | Ethyl acrylate | 1.8 | | 6.8 | 1.8 | 1.8 |
| | n-Butyl acrylate | 8 | 6 | 5 | 9 | 9 |
| | Allyl methacrylate | | 1 | | | |
| 5% 2-(dimethylamino) ethanol aqueous solution | | 40 | 40 | 40 | 40 | 40 |
| Solid content (%) | | 30 | 30 | 30 | 30 | 30 |
| Acid value (mg KOH/g) | | 33 | 22 | 28 | 33 | 33 |
| Hydroxy value (mg KOH/g) | | 25 | 11 | 10 | 25 | 25 |

In Table 1, methylene bisacrylamide and allyl methacrylate in the monomer emulsion for the core portion are polymerizable unsaturated monomers having two polymerizable unsaturated groups per molecule. Moreover, styrene and 2-ethylhexyl acrylate in the monomer emulsion for the shell portion are hydrophobic polymerizable unsaturated monomers.

In Table 1, hydroxy-containing acrylic resins (A1-1) to (A1-9) correspond to core-shell-type water-dispersible acrylic resin (A1').

Preparation of Hydroxy-Containing Polyester Resin (A2)

Preparation Example 12

A reaction vessel having a thermometer, thermostat, stirrer, reflux condenser and water separator was loaded with 109 parts of trimethylolpropane, 141 parts of 1,6-hexanediol, 126 parts of 1,2-cyclohexanedicarboxylic anhydride and 120 parts of adipic acid. The mixture was heated from 160° C. to 230° C. over 3 hours, and was then allowed to undergo a condensation reaction at 230° C. for 4 hours. Subsequently, to introduce a carboxy group into the obtained condensation reaction product, 38.3 parts of trimellitic anhydride was added to the product and caused to react at 170° C. for 30 minutes, and the reaction mixture was then diluted with ethylene glycol mono-2-ethylhexyl ether (the amount that dissolves in 100 g of water at 20° C.: 0.5 g), giving a solution of hydroxy-containing polyester resin (A2-1) having a solid content of 70%. The obtained hydroxy-containing polyester resin had an acid value of 46 mg KOH/g, a hydroxy value of 150 mg KOH/g, and a number average molecular weight of 1,400. In the constitutional ratios of starting materials, the total amount of alicyclic polybasic acids contained in the acid components was 46 mol % relative to total amount of the acid components.

Preparation Example 13

A reaction vessel having a thermometer, thermostat, stirrer, reflux condenser and water separator was loaded with 113 parts of trimethylolpropane, 131 parts of neopentyl glycol, 80 parts of 1,2-cyclohexanedicarboxylic acid anhydride, 93 parts of isophthalic acid and 91 parts of adipic acid. The mixture was heated from 160° C. to 230° C. over 3 hours, and was then allowed to undergo a condensation reaction at 230° C. for 4 hours. Subsequently, to introduce a carboxy group into the obtained condensation reaction product, 33.5 parts of trimellitic anhydride was further added to the product, and was allowed to react at 170° C. for 30 minutes. The reaction mixture was then diluted with ethylene glycol mono-2-ethylhexyl ether (the amount that dissolves in 100 g of water at 20° C.: 0.5 g), giving a solution of a hydroxy-containing polyester resin (A2-2) having a solid content of 70%. The obtained hydroxy-containing polyester resin had an acid value of 40 mg KOH/g, a hydroxy value of 161 mg KOH/g, and a number average molecular weight of 1,300. In the constitutional ratios of the starting materials, the total amount of alicyclic polybasic acids contained in the acid components was 28 mol % relative to the total amount of the acid components.

Preparation Example 14

A solution of a hydroxy-containing polyester resin (A2-3) was obtained in a manner similar to that in Preparation Example 12 except for the use of a dilution solvent, ethylene glycol mono-n-butyl ether (the amount that dissolves in 100 g of water at 20° C.: unlimited) instead of ethylene glycol mono-2-ethylhexyl ether.

Preparation of Phosphoric Acid Group-Containing Polymerizable Unsaturated Monomer (a)

Preparation Example 15

A reaction vessel having a thermometer, thermostat, stirrer, reflux condenser, air inlet tube and dropper was loaded with 358 parts of "PLACCEL FM2D" (tradename of Daicel Chemical Industries, Ltd., a monomer prepared by adding 2 moles of ε-caprolactone to 1 mole of 2-hydroxyethyl methacrylate), and 63.9 parts of phosphorus pentaoxide was slowly added to the reaction solution at 50 to 60° C. while dry air was bubbled through the reaction solution. After the entire amount was added, the reaction solution was aged at 60° C. for 5 hours, and 9.0 parts of ion exchange water was added thereto. Aging was carried out at 80° C. for 5 more hours, giving a polyester-modified phosphoric acid group-containing polymerizable unsaturated monomer (a3-1).

Preparation Example 16

A reaction vessel having a thermometer, thermostat, stirrer, reflux condenser, air inlet tube and dropper was loaded with 260 parts of "HEMAC1" (tradename of Daicel Chemical Industries, Ltd., monomer prepared by adding 1 mole of dimethyltrimethylene carbonate to 1 mole of hydroxyethyl methacrylate), and 63.9 parts of phosphorus pentaoxide was slowly added thereto at 50 to 60° C. while dry air was bubbled through the reaction solution. After the entire amount was added, the reaction solution was aged at 60° C. for 5 hours, and 9.0 parts of ion exchange water was added thereto. Aging was carried out at 80° C. for 5 more hours, giving a polycarbonate-modified phosphoric acid group-containing polymerizable unsaturated monomer (a-4-1).

Preparation of Phosphoric Acid Group-Containing Resin (C)

Preparation Example 17

A reaction vessel having a thermometer, thermostat, stirrer, reflux condenser, nitrogen inlet tube and dropper was loaded with 120 parts of propylene glycol monomethyl ether, and was heated to 110° C. While the vessel was retained at the same temperature, 103 parts of a mixture (I) comprising 30 parts of "LIGHT-ESTER P-1M" (tradename of Kyoeisha Chemical Co., Ltd, acid phosphoxyethyl methacrylate, a compound of formula (3), wherein $R^1$ is a methyl group and $R^7$ is an ethylene group), 20 parts of n-butyl acrylate, 25 parts of styrene, 15 parts of lauryl methacrylate, 10 parts of 2-hydroxyethyl acrylate and 3 parts of t-butyl peroxy-2-ethylhexanoate was added to the vessel dropwise over 4 hours. After the completion of dropwise addition, the mixture was stirred and aged for 1 hour. A polymerization initiator solution containing 1 part of t-butyl peroxy-2-ethylhexanoate and 30 parts of propylene glycol monomethyl ether was then added dropwise thereto over 1 hour. After the completion of dropwise addition, the mixture was stirred and aged for 1 hour, giving a solution of a phosphoric acid group-containing resin (C-1) having a solid content of 50%. The phosphoric acid group-containing resin (C-1) had an acid value of 141 mg KOH/g, a hydroxy value of 48 mg KOH/g, and a number average molecular weight of 12,000.

Preparation Examples 18 to 29

Solutions of phosphoric acid group-containing resins (C-2) to (C-13) having a solid content of 50% were obtained in a manner similar to that of Preparation Example 17 except for the use of the mixtures having the formulation ratios shown in Table 2 in place of mixture (I) in Preparation Example 17.

Table 2 shows the mixtures (parts) of starting materials, acid values (mg KOH/g), hydroxy values (mg KOH/g) and number average molecular weights of the phosphoric acid group-containing resins (C-1) to (C-13).

In Table 2, (Note 1) represents the substance described below.

(Note 1) Phosmer PP: tradename of Uni Chemical Co., Ltd., acid phosphooxypoly(oxypropylene) glycol monomethacrylate. The compound represented by said formula (4), wherein $R^1$ is a methyl group; $R^8$ is a propylene group; and p is 5 or 6.

"LIGHT-ESTER P-1M" is an alkylene-modified phosphoric acid group-containing monomer (a1); "Phosmer PP" is an oxyalkylene-modified phosphoric acid group-containing monomer (a2); monomer (a3-1) is a polyester-modified phosphoric acid group-containing monomer (a3); and monomer (a-4-1) is a polycarbonate-modified phosphoric acid group-containing monomer (a4). Moreover, styrene and lauryl methacrylate are hydrophobic polymerizable unsaturated monomers.

TABLE 2

| | | Preparation Example | | | | | | |
|---|---|---|---|---|---|---|---|---|
| | | 17 | 18 | 19 | 20 | 21 | 22 | 23 |
| Name of phosphoric acid group-containing resin | | C-1 | C-2 | C-3 | C-4 | C-5 | C-6 | C-7 |
| Phosphoric acid group-containing polymerizable monomer (a) | "LIGHT-ESTER P-1M" | 30 | 25 | 10 | | | 30 | 30 |
| | "Phosmer PP" (Note 1) | | | 30 | | | | |
| | Monomer (a3-1) | | | | 50 | | | |
| | Monomer (a4-1) | | | | | 50 | | |
| Other polymerizable monomers (b) | Styrene | 25 | 25 | 25 | 25 | 25 | 8 | 8 |
| | Lauryl methacrylate | 15 | 15 | 15 | 15 | 15 | 5 | 22 |
| | 2-Hydroxyethyl acrylate | 10 | 10 | 10 | 10 | 10 | 10 | 10 |
| | Methacrylic acid | | 5 | | | | | |
| | n-Butyl acrylate | 20 | 20 | 10 | | | 47 | 30 |
| t-Butyl peroxy-2-ethylhexanoate | | 3 | 3 | 3 | 3 | 3 | 3 | 3 |
| Acid value (mg KOH/g) | | 141 | 150 | 120 | 64 | 83 | 141 | 141 |
| Hydroxy value (mg KOH/g) | | 48 | 48 | 48 | 48 | 48 | 48 | 48 |
| Number average molecular weight (×10³) | | 12 | 11 | 12 | 9 | 10 | 8 | 8 |

| | | Preparation Example | | | | | |
|---|---|---|---|---|---|---|---|
| | | 24 | 25 | 26 | 27 | 28 | 29 |
| Name of phosphoric acid group-containing resin | | C-8 | C-9 | C-10 | C-11 | C-12 | C-13 |
| Phosphoric acid group-containing polymerizable monomer (a) | "LIGHT-ESTER P-1M" | 30 | 30 | 30 | 20 | 30 | 30 |
| | "Phosmer PP" (Note 1) | | | | | | |
| | Monomer (a3-1) | | | | | | |
| | Monomer (a4-1) | | | | | | |
| Other polymerizable monomers (b) | Styrene | 15 | 15 | 40 | 50 | 25 | 25 |
| | Lauryl methacrylate | 15 | 25 | 10 | 10 | 15 | 15 |
| | 2-Hydroxyethyl acrylate | 10 | 10 | 10 | 10 | 4 | 30 |
| | Methacrylic acid | | | | | | |
| | n-Butyl acrylate | 30 | 20 | 10 | 10 | 26 | |
| t-Butyl peroxy-2-ethylhexanoate | | 3 | 3 | 3 | 3 | 3 | 3 |
| Acid value (mg KOH/g) | | 141 | 141 | 141 | 94 | 141 | 141 |
| Hydroxy value (mg KOH/g) | | 48 | 48 | 48 | 48 | 19 | 145 |
| Number average molecular weight (×10³) | | 9 | 10 | 15 | 12 | 11 | 10 |

Preparation of Aqueous Metallic Coating Composition

Example 1

Thirty five parts of ethylene glycol 2-ethylhexyl ether was placed into a stirring and mixing container, and 19 parts of an aluminium pigment paste (tradename "GX-180A", manufactured by Asahi Kasei Metals, Ltd., metallic content: 74%, hereinafter referred to as "metallic pigment (E-1)"), 8 parts of the solution of phosphoric acid group-containing resin (C-1) obtained in Preparation Example 17 and 0.2 parts of 2-(dimethylamino)ethanol were added thereto and uniformly mixed, giving a metallic pigment dispersion.

Subsequently, 10 parts of nitrogen-containing compound (D-1) (Note 2), 100 parts of the dispersion of water-dispersible hydroxy-containing acrylic resin (A1-1) obtained in Preparation Example 1, 57 parts of the solution of the hydroxy-containing polyester resin (A2-1) obtained in Preparation Example 12, 37.5 parts of melamine resin (B-1) (methyl-butyl-etherified melamine resin, solid content: 80%, weight average molecular weight: 1,500) and 62.2 parts of the metallic pigment dispersion were added thereto and uniformly mixed. Deionized water and 2-(dimethylamino)ethanol were further added to the mixture, giving an aqueous metallic coating composition (X-1) having pH 8.0 and a solid content of 25%.

(Note 2) Nitrogen-containing compound (D-1): Polyoxyethylene n-butylamine. The compound represented by said formula (9), wherein $R^{17}$ is an n-butyl group; $R^5$ and $R^6$ are ethylene groups; and m+n=3. Moreover, its HLB value is 12.9, and the molecular weight is 205.

Examples 2 to 30

Aqueous metallic coating compositions (X-2) to (X-30) having pH 8.0 and a solid content of 25% were obtained in a manner similar to that in Example 1, except that the constitutional ratios in each Example were as shown in Table 3 below.

The nitrogen-containing compounds (D-2) to (D-15) in Table 3 shown below are as follows.

Nitrogen-containing compound (D-2): polyoxyethylene n-hexylamine. The compound represented by said formula (9), wherein $R^{17}$ is an n-hexyl group; $R^5$ and $R^6$ are ethylene groups; and m+n=7. Moreover, its HLB value is 15.1 and molecular weight is 409.

Nitrogen-containing compound (D-3): Polyoxyethylene n-octylamide. The compound represented by said formula (7), wherein $R^{15}$ is an n-octyl group; $R^5$ and $R^6$ are ethylene groups; and m+n=7. Moreover, its HLB value is 13.2 and molecular weight is 465.

Nitrogen-containing compound (D-4): Polyoxyethylene n-octylamine. The compound represented by said formula (9), wherein $R^{17}$ is an n-octyl group; $R^5$ and $R^6$ are ethylene groups; and m+n=7. Moreover, its HLB value is 14.1 and molecular weight is 437.

Nitrogen-containing compound (D-5): Polyoxyethylene laurylamine. The compound represented by said formula (9), wherein $R^{17}$ is an n-dodecyl group; $R^5$ and $R^6$ are ethylene groups; and m+n=10. Moreover, its HLB value is 14.1 and molecular weight is 625.

Nitrogen-containing compound (D-6): polyoxyethylene laurylamide. The compound represented by said formula (7), wherein $R^{15}$ is an n-dodecyl group; $R^5$ and $R^6$ are ethylene groups; and m+n=15. Moreover, its HLB value is 15.1 and molecular weight is 873.

Nitrogen-containing compound (D-7): polyoxyethylene laurylamine. The compound represented by said formula (9), wherein $R^{17}$ is an n-dodecyl group; $R^5$ and $R^6$ are ethylene groups; and m+n=15. Moreover, its HLB value is 15.6 and molecular weight is 845.

Nitrogen-containing compound (D-8): Polyoxyethylene myristylamide. The compound represented by said formula (7), wherein $R^{15}$ is an n-tetradecyl group; $R^5$ and $R^6$ are ethylene groups; and m+n=15. Moreover, its HLB value is 14.7 and molecular weight is 901.

Nitrogen-containing compound (D-9): Polyoxyethylene myristylamine. The compound represented by said formula (9), wherein $R^{17}$ is an n-tetradecyl; $R^5$ and $R^6$ are ethylene groups; and m+n=15. Moreover, its HLB value is 15.1 and molecular weight is 873.

Nitrogen-containing compound (D-10): Polyoxyethylene palmitylamine. The compound represented by said formula (7), wherein $R^{15}$ is an n-hexadecyl group; $R^5$ and $R^6$ are ethylene groups; and m+n=20. Moreover, its HLB value is 15.3 and molecular weight is 1,149.

Nitrogen-containing compound (D-11): Polyoxyethylene stearylamide. The compound represented by said formula (7), wherein $R^{15}$ is an n-octadecyl group; $R^5$ and $R^6$ are ethylene groups; and m+n=15. Moreover, its HLB value is 13.8 and molecular weight is 957.

Nitrogen-containing compound (D-12): Polyoxyethylene stearylamine. The compound represented by said formula (9), wherein $R^{17}$ is an n-octadecyl group; $R^5$ and $R^6$ are ethylene groups; and m+n=20. Moreover, its HLB value is 15.3 and molecular weight is 1,149.

Nitrogen-containing compound (D-13): Polyoxyethylene oleylamine. The compound represented by said formula (7), wherein $R^{15}$ is a (9Z)-9-octadecenyl group; $R^5$ and $R^6$ are ethylene groups; and m+n=20. Moreover, its HLB value is 15.0 and molecular weight is 1,175.

Nitrogen-containing compound (D-14): Polyoxyethylene n-propylamine. The compound represented by said formula (9), wherein $R^{17}$ an n-propyl group; $R^5$ and $R^6$ are ethylene groups; and m+n=3. Moreover, its HLB value is 13.8 and molecular weight is 191.

Nitrogen-containing compound (D-15): Polyoxyethylene lignocerylamide. The compound represented by said formula (7), wherein $R^{15}$ is an n-tetracosyl group; $R^5$ and $R^6$ are ethylene groups; and m+n=20. Moreover, its HLB value is 14.0 and molecular weight is 1,261.

Moreover, the melamine resin (B-2) in Table 3 shown below is a methyl-etherified melamine resin (weight average molecular weight: 800, solid content: 80%).

Example 31

Thirty five parts of ethylene glycol monobutyl ether was placed in a stirring and mixing container, and 19 parts of aluminium pigment paste "GX-180A" (metallic pigment E-1), 8 parts of the solution of the phosphoric acid group-containing resin (C-1) obtained in Preparation Example 17 and 0.2 parts of 2-(dimethylamino)ethanol were added thereto and uniformly mixed, giving a metallic pigment dispersion.

Subsequently, 10 parts of the nitrogen-containing compound (D-7) mentioned above, 100 parts of the dispersion of the water-dispersible acrylic resin (A1-1) obtained in Preparation Example 1, 57 parts of the solution of the hydroxy-containing polyester resin (A2-3) obtained in Preparation Example 14, 37.5 parts of a melamine resin (B-1) (methyl-butyl-etherified melamine resin, solid content: 80%, weight average molecular weight: 1,500) and 62.2 parts of the metallic pigment dispersion were uniformly mixed. Deionized water and 2-(dimethylamino)ethanol were further added to the mixture, giving an aqueous metallic coating composition (X-31) having pH 8.0 and a solid content of 25%.

Comparative Examples 1 to 3

Aqueous metallic coating compositions (X-45) to (X-47) having pH 8.0 and a solid content of 25% were obtained in a manner similar to Example 1 except that the constitutional ratios were as shown in Table 3 below in each Example.

Coating Composition Performance Test

The aqueous metallic coating compositions obtained in Examples 1 to 31 and Comparative Examples 1 to 3 were tested for the amounts of gas they generate as a coating composition performance. The test method is as follows.

The aqueous metallic coating compositions obtained in Examples 1 to 31 and Comparative Examples 1 to 3 (X-1) to (X-31) and (X-45) to (X-47) all had a solid content of 25%, and the percentage of the aluminium pigment contained in the coating compositions was 2.7%. The amounts of gas (mL) generated by these coating compositions were determined in the following manner: 150 g of each of the coating compositions was placed at the bottom of a 300-ml Erlenmeyer flask. A measuring pipette was inserted at the center of this Erlenmeyer flask approximately perpendicularly, and was retained in such a manner that the lower end of the measuring pipette was dipped into the aqueous metallic coating composition and positioned about 5 mm above the bottom of the flask. The portion between the outer circumferential surface of the measuring pipette and the inner circumferential surface of the open portion of the Erlenmeyer flask was tightly sealed with a cork stopper, and the inside passage of the measuring pipette was left in communication with the outside. In this state, the flask was stored at 40° C. for 10 days, and the volume of aqueous metallic coating in the measuring pipette pushed up by the pressure of gas generated during storage was read from the scale of the pipette. This reading was considered as the amount of gas (mL) generated.

Table 3 shows the constitutional ratios of the aqueous metallic coating compositions obtained in Examples 1 to 31 and Comparative Examples 1 to 3 and the measurement results of the amounts of gas generated by the same.

TABLE 3

| | | Examples | | | | | | | | |
|---|---|---|---|---|---|---|---|---|---|---|
| | | 1 | 2 | 3 | 4 | 5 | 6 | 7 | 8 | 9 |
| Name of aqueous metallic coating composition | | X-1 | X-2 | X-3 | X-4 | X-5 | X-6 | X-7 | X-8 | X-9 |
| Hydroxy-containing acrylic resin (A1) | Type | A1-1 | A1-1 | A1-1 | A1-1 | A1-1 | A1-1 | A1-1 | A1-1 | A1-1 |
| | Amount | 30 | 30 | 30 | 30 | 30 | 30 | 30 | 30 | 30 |
| Hydroxy-containing polyester resin (A2) | Type | A2-1 | A2-1 | A2-1 | A2-1 | A2-1 | A2-1 | A2-1 | A2-1 | A2-1 |
| | Amount | 40 | 40 | 40 | 40 | 40 | 40 | 40 | 40 | 40 |
| Curing agent (B) | Type | B-1 | B-1 | B-1 | B-1 | B-1 | B-1 | B-1 | B-1 | B-1 |
| | Amount | 30 | 30 | 30 | 30 | 30 | 30 | 30 | 30 | 30 |
| Phosphoric acid group-containing resin (C) | Type | C-1 | C-1 | C-1 | C-1 | C-1 | C-1 | C-1 | C-1 | C-1 |
| | Amount | 4 | 4 | 4 | 4 | 4 | 4 | 4 | 4 | 4 |
| Nitrogen-containing compound (D) | Type | D-1 | D-2 | D-3 | D-4 | D-5 | D-6 | D-7 | D-8 | D-9 |
| | Amount | 10 | 10 | 10 | 10 | 10 | 10 | 10 | 10 | 10 |
| Metallic pigment (E) | Type | E-1 | E-1 | E-1 | E-1 | E-1 | E-1 | E-1 | E-1 | E-1 |
| | Amount | 14 | 14 | 14 | 14 | 14 | 14 | 14 | 14 | 14 |
| Amount of gas generated (mL) | | 4.5 | 4.4 | 4.5 | 4.3 | 4.5 | 4.5 | 4.3 | 4.5 | 4.4 |

| | | Examples | | | | | | | | |
|---|---|---|---|---|---|---|---|---|---|---|
| | | 10 | 11 | 12 | 13 | 14 | 15 | 16 | 17 | 18 |
| Name of aqueous metallic coating composition | | X-10 | X-11 | X-12 | X-13 | X-14 | X-15 | X-16 | X-17 | X-18 |
| Hydroxy-containing acrylic resin (A1) | Type | A1-1 | A1-1 | A1-1 | A1-1 | A1-1 | A1-1 | A1-1 | A1-1 | A1-1 |
| | Amount | 30 | 30 | 30 | 30 | 30 | 30 | 30 | 30 | 30 |
| Hydroxy-containing polyester resin (A2) | Type | A2-1 | A2-1 | A2-1 | A2-1 | A2-1 | A2-1 | A2-1 | A2-1 | A2-1 |
| | Amount | 40 | 40 | 40 | 40 | 40 | 40 | 40 | 40 | 40 |
| Curing agent (B) | Type | B-1 | B-1 | B-1 | B-1 | B-1 | B-1 | B-1 | B-1 | B-1 |
| | Amount | 30 | 30 | 30 | 30 | 30 | 30 | 30 | 30 | 30 |
| Phosphoric acid group-containing resin (C) | Type | C-1 | C-1 | C-1 | C-1 | C-2 | C-3 | C-4 | C-5 | C-6 |
| | Amount | 4 | 4 | 4 | 4 | 4 | 4 | 4 | 4 | 4 |

TABLE 3-continued

| | | | | | | | | | | |
|---|---|---|---|---|---|---|---|---|---|---|
| Nitrogen-containing compound (D) | Type<br>Amount | D-10<br>10 | D-11<br>10 | D-12<br>10 | D-13<br>10 | D-7<br>10 | D-7<br>10 | D-7<br>10 | D-7<br>10 | D-7<br>10 |
| Metallic pigment (E) | Type<br>Amount | E-1<br>14 | E-1<br>14 | E-1<br>14 | E-1<br>14 | E-1<br>14 | E-1<br>14 | E-1<br>14 | E-1<br>14 | E-1<br>14 |
| Amount of gas generated (mL) | | 4.5 | 4.4 | 4.4 | 4.5 | 4.7 | 5.0 | 3.2 | 2.5 | 9.2 |

| | | Examples | | | | | | | | |
|---|---|---|---|---|---|---|---|---|---|---|
| | | 19 | 20 | 21 | 22 | 23 | 24 | 25 | 26 | 27 |
| Name of aqueous metallic coating composition | | X-19 | X-20 | X-21 | X-22 | X-23 | X-24 | X-25 | X-26 | X-27 |
| Hydroxy-containing acrylic resin (A1) | Type<br>Amount | A1-1<br>30 | A1-1<br>30 | A1-1<br>30 | A1-1<br>30 | A1-1<br>30 | A1-1<br>30 | A1-1<br>30 | A1-2<br>30 | A1-3<br>30 |
| Hydroxy-containing polyester resin (A2) | Type<br>Amount | A2-1<br>40 | A2-1<br>40 | A2-1<br>40 | A2-1<br>40 | A2-1<br>40 | A2-1<br>40 | A2-1<br>40 | A2-2<br>40 | A2-3<br>40 |
| Curing agent (B) | Type<br>Amount | B-1<br>30 | B-1<br>30 | B-1<br>30 | B-1<br>30 | B-1<br>30 | B-1<br>30 | B-1<br>30 | B-1<br>30 | B-1<br>30 |
| Phosphoric acid group-containing resin (C) | Type<br>Amount | C-7<br>4 | C-8<br>4 | C-9<br>4 | C-10<br>4 | C-11<br>4 | C-12<br>4 | C-13<br>4 | C-1<br>4 | C-1<br>4 |
| Nitrogen-containing compound (D) | Type<br>Amount | D-7<br>10 | D-7<br>10 | D-7<br>10 | D-7<br>10 | D-7<br>10 | D-7<br>10 | D-7<br>10 | D-7<br>10 | D-7<br>10 |
| Metallic pigment (E) | Type<br>Amount | E-1<br>14 | E-1<br>14 | E-1<br>14 | E-1<br>14 | E-1<br>14 | E-1<br>14 | E-1<br>14 | E-1<br>14 | E-1<br>14 |
| Amount of gas generated (mL) | | 9.0 | 8.1 | 6.0 | 2.1 | 2.0 | 4.2 | 4.8 | 4.4 | 4.2 |

| | | Examples | | | | Comparative Examples | | |
|---|---|---|---|---|---|---|---|---|
| | | 28 | 29 | 30 | 31 | 1 | 2 | 3 |
| Name of aqueous metallic coating composition | | X-28 | X-29 | X-30 | X-31 | X-45 | X-46 | X-47 |
| Hydroxy-containing acrylic resin (A1) | Type<br>Amount | A1-4<br>30 | A1-11<br>30 | A1-1<br>30 | A1-1<br>30 | A1-1<br>30 | A1-1<br>30 | A1-1<br>30 |
| Hydroxy-containing polyester resin (A2) | Type<br>Amount | A2-1<br>40 | A2-1<br>40 | A2-1<br>40 | A2-3<br>40 | A2-1<br>40 | A2-1<br>40 | A2-1<br>40 |
| Curing agent (B) | Type<br>Amount | B-1<br>30 | B-1<br>30 | B-2<br>30 | B-1<br>30 | B-1<br>30 | B-1<br>30 | B-1<br>30 |
| Phosphoric acid group-containing resin (C) | Type<br>Amount | C-1<br>4 | C-1<br>4 | C-1<br>4 | C-1<br>4 | C-1<br>4 | C-1<br>4 | C-1<br>4 |
| Nitrogen-containing compound (D) | Type<br>Amount | D-7<br>10 | D-7<br>10 | D-7<br>10 | D-7<br>10 | —<br>— | D-14<br>10 | D-15<br>10 |
| Metallic pigment (E) | Type<br>Amount | E-1<br>14 | E-1<br>14 | E-1<br>14 | E-1<br>14 | E-1<br>14 | E-1<br>14 | E-1<br>14 |
| Amount of gas generated (mL) | | 4.5 | 4.4 | 4.2 | 4.3 | 4.7 | 4.5 | 4.6 |

The constitutional ratios in Table 3 show the weights of the solid contents (parts) of the constituents.

Example 32

Thirty five parts of 2-ethyl-1-hexanol (the amount that dissolves in 100 g of water at 20° C.: 0.1 g) was placed in a stirring and mixing container, and 19 parts of an aluminium pigment paste "GX-180A" (metallic pigment (E-1)), 10 parts of the solution of the phosphoric acid group-containing resin (C-1) obtained in Preparation Example 17 and 0.2 parts of 2-(dimethylamino) ethanol were uniformly mixed, giving a metallic pigment dispersion.

Subsequently, 6 parts of a nitrogen-containing compound (D-4), 120 parts of the dispersion of the water-dispersible hydroxy-containing acrylic resin (A1-1) obtained in Preparation Example 1, 40 parts of the solution of the hydroxy-containing polyester resin (A2-1) obtained in Preparation Example 12, 60 parts of melamine resin (B-3) (methyl-butyl-etherified melamine resin, solid content: 60%, weight average molecular weight: 2,000) and 64.2 parts of the metallic pigment dispersion described above were uniformly mixed. 2-(Dimethylamino)ethanol and deionized water were further added to the mixture, giving an aqueous metallic coating composition (X-32) having pH 8.0 and a solid content of 25%.

Examples 33 to 42

Aqueous metallic coating compositions (X-33) to (X-42) having pH 8.0 were obtained in a manner similar to that in Example 32 except that the constitutional ratios in Example 32 were as described below in Table 4.

Example 43

Thirty five parts of 2-ethyl-1-hexanol was placed in a stirring and mixing container, and 19 parts of aluminium pigment paste "GX-180A" (metallic pigment (E-1)), 10 parts of the solution of the phosphoric acid group-containing resin (C-1) obtained in Preparation Example 17 and 0.2 parts of 2-(dimethylamino)ethanol were uniformly mixed, giving a metallic pigment dispersion.

Subsequently, 6 parts of nitrogen-containing compound (D-4), 120 parts of the dispersion of the water-dispersible hydroxy-containing acrylic resin (A1-1) obtained in Preparation Example 1, 40 parts of the solution of the hydroxy-containing polyester resin (A2-1) obtained in Preparation Example 12, 60 parts of a melamine resin (B-3) and 64.2 parts of the metallic pigment dispersion described above were uniformly mixed. Further, "UH-752" (tradename of ADEKA Co. Ltd., urethane associative thickening agent), 2-(dimethyl amino)ethanol and deionized water were added thereto, giving an aqueous metallic coating composition (X-43) having pH 8.0, a solid content of 23%, and a viscosity of 40 seconds as measured at 20° C. using Ford cup No. 4.

Example 44

Thirty five parts of 2-ethyl-1-hexanol was placed in a stirring and mixing container, and 19 parts of aluminium pigment paste "GX-180A" (metallic pigment (E-1)), 10 parts of the solution of the phosphoric acid group-containing resin (C-1) obtained in Preparation Example 17 and 0.2 parts of 2-(dimethylamino)ethanol were added thereto and uniformly mixed, giving a metallic pigment dispersion.

Subsequently, 6 parts of the nitrogen-containing compound (D-4), 120 parts of the water-dispersible hydroxy-containing acrylic resin (A1-1) obtained in Preparation Example 1, 40 parts of the solution of the hydroxy-containing polyester resin (A2-1) obtained in Preparation Example 12, 60 parts of a melamine resin (B-3) and 64.2 parts of the metallic pigment dispersion described above were uniformly mixed. "PRIMAL ASE-60" (tradename of Rohm And Haas Company, polyacrylic acid thickening agent), 2-(dimethylamino)ethanol and deionized water were further added to the mixture, giving an aqueous metallic coating composition (X-44) having pH 8.0, a solid content of 23%, and a viscosity of 40 seconds as measured at 20° C. using Ford cup No. 4.

Coating Composition Performance Test

As a coating composition performance, the amount of gas (mL) generated by the aqueous metallic coating compositions (X-32) to (X-44) obtained in Examples 32 to 44 were determined. The test method is as follows.

The aqueous metallic coating compositions (X-32), (X-33), (X-36) to (X-40) and (X-42) all had a solid content of 25%. The aqueous metallic coating compositions (X-34), (X-43) and (X-44) all had a solid content of 23%. The aqueous metallic coating composition (X-35) had a solid content of 27%. The aqueous metallic coating composition (X-41) had a solid content of 20%.

The percentage of the solid content in each of the coating compositions was adjusted to 20% (the percentage of the aluminium pigment contained in each coating composition after adjustment was 2.2%), and then a 150-g portion of the coating composition was placed at the bottom of a 300-ml Erlenmeyer flask. A measuring pipette was inserted in the center of this Erlenmeyer flask approximately perpendicularly, and was retained in such a state that the lower end of the measuring pipette was dipped into the aqueous metallic coating composition and positioned about 5 mm above the bottom of the flask. The portion between the outer circumferential surface of the measuring pipette and the inner circumferential surface of the open portion of the Erlenmeyer flask was tightly sealed with a cork stopper, while the inside passage of the measuring pipette was left in communication with the outside. In this state, the flask was stored at 40° C. for 10 days, and the volume of the aqueous metallic coating composition in the measuring pipette pushed up by the pressure of the gas generated during storage was read from the scale of the measuring pipette. This reading was considered as the amount of gas (mL) generated.

Table 4 shows the constitutional ratios of the aqueous metallic coating compositions obtained in Examples 32 to 44 and the measurement results of the amounts of gas generated by the same.

TABLE 4

| | | Examples | | | | | | |
|---|---|---|---|---|---|---|---|---|
| | | 32 | 33 | 34 | 35 | 36 | 37 | 38 |
| Name of aqueous metallic coating composition | | X-32 | X-33 | X-34 | X-35 | X-36 | X-37 | X-38 |
| Hydroxy-containing acrylic resin (A1) | Type | A1-1 | A1-5 | A1-6 | A1-7 | A1-8 | A1-9 | A1-10 |
| | Amount | 36 | 36 | 36 | 36 | 36 | 36 | 36 |
| Hydroxy-containing polyester resin (A2) | Type | A2-1 | A2-1 | A2-1 | A2-1 | A2-1 | A2-1 | A2-1 |
| | Amount | 28 | 28 | 28 | 28 | 28 | 28 | 28 |

TABLE 4-continued

| | | | | | | | | |
|---|---|---|---|---|---|---|---|---|
| Curing agent (B) | Type | B-3 | B-3 | B-3 | B-3 | B-3 | B-3 | B-3 |
| | Amount | 36 | 36 | 36 | 36 | 36 | 36 | 36 |
| Phosphoric acid group-containing resin (C) | Type | C-1 | C-1 | C-1 | C-1 | C-1 | C-1 | C-1 |
| | Amount | 5 | 5 | 5 | 5 | 5 | 5 | 5 |
| Nitrogen-containing compound (D) | Type | D-4 | D-4 | D-4 | D-4 | D-4 | D-4 | D-4 |
| | Amount | 6 | 6 | 6 | 6 | 6 | 6 | 6 |
| Metallic pigment (E) | Type | E-1 | E-1 | E-1 | E-1 | E-1 | E-1 | E-1 |
| | Amount | 14 | 14 | 14 | 14 | 14 | 14 | 14 |
| Amount of gas generated (mL) | | 4.2 | 4.3 | 4.5 | 4.5 | 4.4 | 4.4 | 4.5 |

| | | Examples | | | | | |
|---|---|---|---|---|---|---|---|
| | | 39 | 40 | 41 | 42 | 43 | 44 |
| Name of aqueous metallic coating composition | | X-39 | X-40 | X-41 | X-42 | X-43 | X-44 |
| Hydroxy-containing acrylic resin (A1) | Type | A1-1 | A1-1 | A1-8 | A1-1 | A1-8 | A1-8 |
| | Amount | 36 | 36 | 47 | 18 | 36 | 36 |
| Hydroxy-containing polyester resin (A2) | Type | A2-1 | A2-2 | A2-1 | A2-1 | A2-1 | A2-1 |
| | Amount | 28 | 28 | 19 | 46 | 28 | 28 |
| Curing agent (B) | Type | B-3 | B-3 | B-3 | B-3 | B-3 | B-3 |
| | Amount | 36 | 36 | 34 | 36 | 36 | 36 |
| Phosphoric acid group-containing resin (C) | Type | C-1 | C-1 | C-1 | C-1 | C-1 | C-1 |
| | Amount | 5 | 5 | 5 | 5 | 5 | 5 |
| Nitrogen-containing compound (D) | Type | D-5 | D-5 | D-5 | D-5 | D-4 | D-4 |
| | Amount | 8 | 8 | 8 | 8 | 6 | 6 |
| Metallic pigment (E) | Type | E-1 | E-1 | E-1 | E-1 | E-1 | E-1 |
| | Amount | 14 | 14 | 14 | 14 | 14 | 14 |
| Amount of gas generated (mL) | | 4.3 | 4.6 | 4.5 | 4.4 | 4.3 | 4.3 |

The constitutional ratios in Table 4 show the solid contents (parts) of the constituents.

Preparation of Substrate

Preparation Example 30

A thermosetting epoxy resin-based cationic electrodeposition coating composition (tradename "Electron GT-10", manufactured by Kansai Paint Co., Ltd.) was applied to a cold-rolled steel plate treated with zinc phosphate by electrodeposition to give a film thickness of 20 μm, and was cured by heating at 170° C. for 30 minutes. Subsequently, an intermediate coating composition (tradename "Amilac TP-65-2", manufactured by Kansai Paint Co., Ltd., a polyester resin-amino resin-based organic solvent type coating composition) was applied onto this electrodeposition coating film to give a film thickness of 35 μm, and was cured by heating at 140° C. for 30 minutes. A substrate in which an electrodeposition coating film and an intermediate coating film were formed on a steel plate was thus prepared.

Method of Forming Coating Films

Example 45

The aqueous metallic coating composition (X-1) obtained in Example 1 was used as a coating composition for forming the base coating in said method I of forming a multilayer coating film, i.e., the two-coat one-bake method, thereby forming a multilayer coating film comprising a base coating and a clear coating on a substrate.

Specifically, under the painting conditions of a temperature of 23° C. and a humidity of 75%, the aqueous metallic coating composition (X-1) was applied to the substrate obtained in Preparation Example 30 by using a rotary-spraying atomizer to give a film thickness of 15 μm, and was left to stand for 2 minutes. Preheating of the coating composition was conducted at 80° C. for 3 minutes. Subsequently, an acrylic resin-based solvent-type clear top coating composition (tradename "Magicron KINO-1210", manufactured by Kansai Paint Co., Ltd.) was applied to the uncured coated surface to give a film thickness of 40 μm, and was left to stand for 7 minutes. The coating composition was then heated at 140° C. for 30 minutes to cure both of these coatings simultaneously. A test plate wherein a multilayer coating film comprising a base coating and a clear coating are formed on the substrate was thus obtained.

Examples 46 to 88 and Comparative Examples 4 to 6

Test plates of Examples 46 to 88 and Comparative Examples 4 to 6 were obtained in a manner similar to that in Example 45 except that the aqueous metallic coating compositions shown in Table 5 were used in place of the aqueous metallic coating composition (X-1) in Example 45.

Coated Film Performance Test

The multilayer coating films of the test plates obtained in Examples 45 to 88 and Comparative Examples 4 to 6 mentioned above were tested for their coating film performance in smoothness, luster, finished appearance and water-resistant ahesion. The test method is as follows:

Smoothness: Smoothness was evaluated based on the Wd value measured by "Wave Scan DOI" (tradename of BYK-Gardner GmbH). The Wd value is an index that indicates the degree of surface roughness using the amplitude of wavelengths from about 3 to 10 mm, and the lower the measurement value, the higher the smoothness of the coated surface.

Luster: The lightness values L* of the test plates defined in JIS Z 8729 when light was irradiated at an angle of 25° with respect to the sensor positioned on a line perpendicular to the coating film were determined using a spectrophotometric calorimeter (tradename "CM-512 m3", manufactured by Konica Minolta Sensing, Inc.). The greater the value L*, the higher the luster of the coated surface.

Finished appearance: the presence or absence of abnormalities such as cissing and dents on the test plates were visually observed and evaluated on the following scale:

A: No abnormalities such as cissing or dents found;

B: Almost no abnormalities such as cissing and dents found; and

C: Considerable abnormalities such as cissing and dents found.

Water-resistant ahesion: The test plates were immersed in warm water at 40° C. for 240 hours and removed therefrom, and were then dried at 20° C. for 12 hours. Lattice-like cuts were made in the multilayer coating films on the test plates with a knife to reach the base material to make 100 crosscuts having a size of 2 mm×2 mm. Subsequently, an adhesive cellophane tape was affixed to their surfaces, the tape was abruptly peeled off at 20° C., and the resultant conditions of the crosscut coating films were evaluated. The evaluation scale for water-resistant ahesion used was as follows:

A: 100 crosscut sections of coating film retained, and no chipped edges were produced;

B: 100 crosscut sections of coating film retained, but chipped edges were produced;

C: 90 to 99 crosscut sections of coating film retained; and

D: The number of remaining crosscut sections of coating film was 89 or less.

Table 5 shows the test results of the coating film performance.

TABLE 5

| | Examples | | | | | | | |
|---|---|---|---|---|---|---|---|---|
| | 45 | 46 | 47 | 48 | 49 | 50 | 51 | 52 |
| Name of aqueous metallic coating composition | X-1 | X-2 | X-3 | X-4 | X-5 | X-6 | X-7 | X-8 |
| Smoothness | 7.5 | 7.1 | 5.5 | 5.3 | 6.0 | 5.8 | 5.5 | 6.4 |
| Luster | 93 | 96 | 98 | 100 | 98 | 100 | 101 | 98 |
| Finished appearance | A | A | A | A | A | A | A | A |
| Water-resistant ahesion | B | B | A | A | A | A | A | A |

TABLE 5-continued

| | Examples | | | | | | | |
|---|---|---|---|---|---|---|---|---|
| | 53 | 54 | 55 | 56 | 57 | 58 | 59 | 60 |
| Name of aqueous metallic coating composition | X-9 | X-10 | X-11 | X-12 | X-13 | X-14 | X-15 | X-16 |
| Smoothness | 6.2 | 7.2 | 7.4 | 7.5 | 7.8 | 5.6 | 5.6 | 5.8 |
| Luster | 99 | 96 | 95 | 95 | 94 | 100 | 100 | 99 |
| Finished appearance | A | B | B | B | B | A | A | A |
| Water-resistant ahesion | A | A | A | A | B | A | B | B |

| | Examples | | | | | | | |
|---|---|---|---|---|---|---|---|---|
| | 61 | 62 | 63 | 64 | 65 | 66 | 67 | 68 |
| Name of aqueous metallic coating composition | X-17 | X-18 | X-19 | X-20 | X-21 | X-22 | X-23 | X-24 |
| Smoothness | 5.7 | 5.6 | 5.7 | 5.6 | 5.7 | 5.7 | 5.6 | 5.7 |
| Luster | 100 | 99 | 99 | 100 | 100 | 100 | 101 | 99 |
| Finished appearance | A | A | A | A | A | A | A | A |
| Water-resistant ahesion | A | B | B | A | A | A | A | B |

| | Examples | | | | | | | |
|---|---|---|---|---|---|---|---|---|
| | 69 | 70 | 71 | 72 | 73 | 74 | 75 | 76 |
| Name of aqueous metallic coating composition | X-25 | X-26 | X-27 | X-28 | X-29 | X-30 | X-31 | X-32 |
| Smoothness | 5.7 | 5.9 | 5.4 | 6.4 | 7.5 | 5.7 | 5.9 | 5.3 |
| Luster | 100 | 99 | 102 | 96 | 94 | 99 | 96 | 101 |
| Finished appearance | A | A | A | A | A | A | A | A |
| Water-resistant ahesion | A | A | A | A | A | B | A | A |

| | Examples | | | | | | | |
|---|---|---|---|---|---|---|---|---|
| | 77 | 78 | 79 | 80 | 81 | 82 | 83 | 84 |
| Name of aqueous metallic coating composition | X-33 | X-34 | X-35 | X-36 | X-37 | X-38 | X-39 | X-40 |
| Smoothness | 5.9 | 5.8 | 6.4 | 6.2 | 5.7 | 7.9 | 5.9 | 7.4 |
| Luster | 99 | 103 | 96 | 99 | 100 | 93 | 100 | 99 |
| Finished appearance | A | A | A | A | A | A | A | A |
| Water-resistant ahesion | B | B | A | A | A | B | A | A |

| | Examples | | | | Comparative Examples | | |
|---|---|---|---|---|---|---|---|
| | 85 | 86 | 87 | 88 | 4 | 5 | 6 |
| Name of aqueous metallic coating composition | X-41 | X-42 | X-43 | X-44 | X-45 | X-46 | X-47 |
| Smoothness | 7.3 | 6.3 | 5.5 | 5.7 | 14.5 | 10.3 | 10.7 |
| Luster | 105 | 96 | 102 | 102 | 87 | 89 | 88 |
| Finished appearance | A | A | A | A | B | B | C |
| Water-resistant ahesion | A | A | A | B | B | D | B |

The invention claimed is:

1. An aqueous metallic coating composition comprising:
   (A) an aqueous film-forming resin which is at least one member selected from the group consisting of a hydroxy-containing acrylic resin (A1) and a hydroxy-containing polyester resin (A2), and the hydroxy-containing acrylic resin (A1) is a core-shell-type water-dispersible acrylic resin (A1') comprising:
   a core copolymer (I) consisting of 0.1 to 30 mass % of a polymerizable unsaturated monomer having two or more polymerizable unsaturated groups per molecule and 70 to 99.9 mass % of a polymerizable unsaturated monomer having one polymerizable unsaturated group per molecule as monomer components; and
   a shell copolymer (II) consisting of 5 to 50 mass % of a hydrophobic polymerizable unsaturated monomer, 1 to 40 mass % of a hydroxy-containing polymerizable unsaturated monomer, and 10 to 94 mass % of other polymerizable unsaturated monomer(s) as monomer components; and
   the solids mass ratio of copolymer (I) to copolymer (II) is in the range of 10/90 to 90/10;
   (B) a curing agent;
   (C) a phosphoric acid group-containing resin having an acid value of 10 to 200 mg KOH/g and obtained by copolymerizing a phosphoric acid group-containing polymerizable unsaturated monomer (a) with other polymerizable unsaturated monomer(s) (b);
   the monomer (a) being represented by the formula

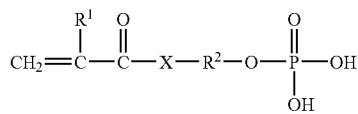
(1)

wherein $R^1$ represents a hydrogen atom or a methyl group, X represents —O— or —NH—, and $R^2$ represents a $C_{1-30}$ divalent organic group;
   (D) a nitrogen-containing compound represented by the formula

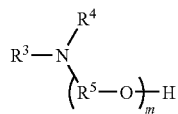
(2)

wherein $R^3$ represents a $C_{4-22}$ monovalent organic group, $R^4$ represents a $C_{4-22}$ hydrocarbon group, a $C_{4-22}$ acyl group or

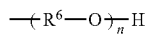

wherein $R^6$ represents a $C_{2-10}$ alkylene group, and n is an integer of 0 to 100, and when n is 2 or more, the $R^6$'s may be the same or different;
and also wherein $R^5$ represents a $C_{2-10}$ alkylene group, m is an integer of 1 to 100, and when m is 2 or more, the $R^5$'s may be the same or different; and
   (E) a metallic pigment.

2. An aqueous metallic coating composition according to claim 1 wherein the curing agent (B) is at least one member selected from the group consisting of amino resins, blocked polyisocyanate compounds, and carbodiimide group-containing compounds.

3. An aqueous metallic coating composition according to claim 1 wherein the proportion of the aqueous film-forming resin (A) to the curing agent (B) is 50 to 90 mass % of the former to 50 to 10 mass % of the latter, based on the total mass of both components.

4. An aqueous metallic coating composition according to claim 1 wherein the phosphoric acid group-containing polymerizable unsaturated monomer (a) is a monomer (a1) represented by the formula

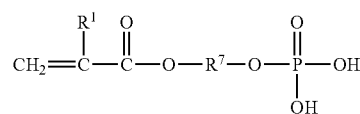
(3)

wherein $R^1$ is as defined above, and $R^7$ is a $C_{1-6}$ alkylene group.

5. An aqueous metallic coating composition according to claim 1 wherein the phosphoric acid group-containing polymerizable unsaturated monomer (a) is a monomer (a2) represented by the formula

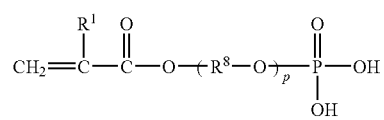
(4)

wherein $R^1$ is as defined above, $R^8$ represents a $C_{1-10}$ alkylene group, p is an integer of 3 to 30, and the $R^8$'s may be the same or different.

6. An aqueous metallic coating composition according to claim 1 wherein the phosphoric acid group-containing polymerizable unsaturated monomer (a) is a monomer (a3) represented by the formula

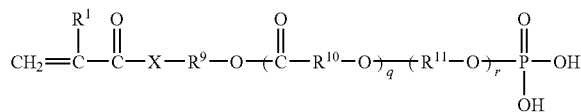
(5)

wherein $R^1$ and X are as defined above, $R^9$ represents a $C_{1-6}$ alkylene group, $R^{10}$ and $R^{11}$ independently represent a $C_{1-10}$ alkylene group, q is an integer of 1 to 30, when q is 2 or more, the $R^{10}$'s may be the same or different, r is an integer of 0 to 30, and when r is 2 or more, the $R^{11}$'s may be the same or different.

7. An aqueous metallic coating composition according to claim 1 wherein the phosphoric acid group-containing polymerizable unsaturated monomer (a) is a monomer (a4) represented by the formula (6)

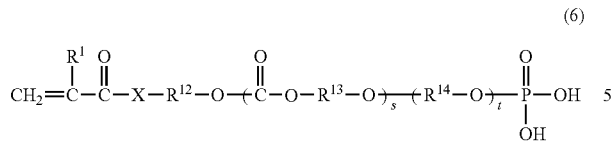

wherein $R^1$ and X are as defined above, $R^{12}$ represents a $C_{1-6}$ alkylene group, $R^{13}$ and $R^{14}$ independently represent a $C_{1-10}$ alkylene group, s is an integer of 1 to 30, when s is 2 or more, the $R^{13}$'s may be the same or different, t is an integer of 0 to 30, and when t is 2 or more, the $R^{14}$'s may be the same or different.

8. An aqueous metallic coating composition according to claim 1 wherein the proportion of the phosphoric acid group-containing polymerizable unsaturated monomer (a) to the polymerizable unsaturated monomer (b) is 10 to 70 mass % of the former to 90 to 30 mass % of the latter, based on the total mass of both monomers.

9. An aqueous metallic coating composition according to claim 1 wherein the polymerizable unsaturated monomer (b) comprises a hydrophobic polymerizable unsaturated monomer.

10. An aqueous metallic coating composition according to claim 9 wherein the content of the hydrophobic polymerizable unsaturated monomer is 5 to 80 mass %, based on the total mass of the phosphoric acid group-containing polymerizable unsaturated monomer (a) and the polymerizable unsaturated monomer (b).

11. An aqueous metallic coating composition according to claim 9 wherein the hydrophobic polymerizable unsaturated monomer is at least one monomer selected from the group consisting of $C_{6-22}$ alkyl or cycloalkyl (meth)acrylates, isobornyl-containing polymerizable unsaturated monomers, adamantyl-containing polymerizable unsaturated monomers, and aromatic ring-containing polymerizable unsaturated monomers.

12. An aqueous metallic coating composition according to claim 1 wherein the proportion of the phosphoric acid group-containing resin (C) is 0.1 to 40 parts by mass, based on 100 parts by mass of the total of the aqueous film-forming resin (A) and the curing agent (B).

13. An aqueous metallic coating composition according to claim 1 wherein the nitrogen-containing compound (D) is a nitrogen-containing compound (D1) represented by the formula (7)

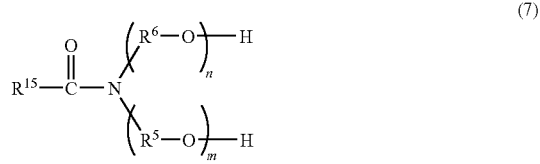

wherein $R^{15}$ represents $C_{3-21}$ hydrocarbon group, and $R^5$, $R^6$, m and n are as defined above, with the proviso that $1 \leq m+n \leq 100$.

14. An aqueous metallic coating composition according to claim 1 wherein the nitrogen-containing compound (D) is a nitrogen-containing compound (D2) represented by the formula (8)

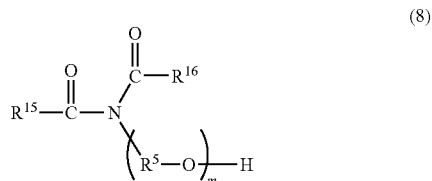

wherein $R^{15}$ and $R^{16}$ independently represent a $C_{3-21}$ hydrocarbon group, and $R^5$ and m are as defined above.

15. An aqueous metallic coating composition according to claim 1 wherein the nitrogen-containing compound (D) is a nitrogen-containing compound (D3) represented by the formula (9)

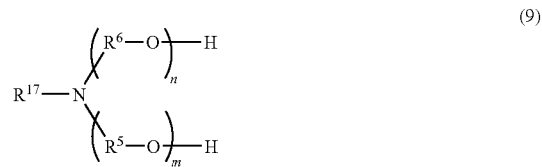

wherein $R^{17}$ represents a $C_{4-22}$ hydrocarbon group, and $R^5$, $R^6$, m and n are as defined above.

16. An aqueous metallic coating composition according to claim 1 wherein the nitrogen-containing compound (D) is a nitrogen-containing compound (D4) represented by the formula (10)

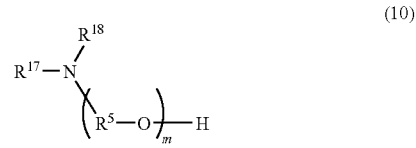

wherein $R^{17}$ and $R^{18}$ independently represent a $C_{4-22}$ hydrocarbon group, and $R^5$ and m are as defined above.

17. An aqueous metallic coating composition according to claim 1 wherein the nitrogen-containing compound (D) has an HLB value of 8 to 18.

18. An aqueous metallic coating composition according to claim 1 wherein the proportion of the nitrogen-containing compound (D) is 1 to 30 parts by mass, based on 100 parts by mass of the total of the aqueous film-forming resin (A) and the curing agent (B).

19. An aqueous metallic coating composition according to claim 1 wherein the metallic pigment (E) is an aluminum pigment.

20. An aqueous metallic coating composition according to claim 1 wherein the proportion of the metallic pigment (E) is 1 to 60 parts by mass, based on 100 parts by mass of the total of the aqueous film-forming resin (A) and the curing agent (B).

21. An aqueous metallic coating composition according to claim 1 further comprising a hydroxy-containing polyester resin (A2).

22. A method for forming a multilayer coating film comprising
   (1) a step of applying the aqueous metallic coating composition of claim 1 to a substrate to form a metallic base coating,
   (2) a step of applying a clear coating composition to the uncured metallic base coating surface to form a clear coating, and
   (3) a step of heating the uncured metallic base coating and the uncured clear coating to cure the coatings at the same time.

23. An article coated using the method of claim 22.

* * * * *